(12) United States Patent
Ichikawa et al.

(10) Patent No.: US 9,755,436 B2
(45) Date of Patent: Sep. 5, 2017

(54) POWER RECEIVING DEVICE AND POWER TRANSMITTING DEVICE

(71) Applicants: Shinji Ichikawa, Toyota (JP); Hideaki Yamada, Kariya (JP)

(72) Inventors: Shinji Ichikawa, Toyota (JP); Hideaki Yamada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 14/758,036

(22) PCT Filed: Feb. 14, 2013

(86) PCT No.: PCT/JP2013/053511
§ 371 (c)(1),
(2) Date: Jun. 26, 2015

(87) PCT Pub. No.: WO2014/125596
PCT Pub. Date: Aug. 21, 2014

(65) Prior Publication Data
US 2015/0357828 A1    Dec. 10, 2015

(51) Int. Cl.
*H02J 1/02*    (2006.01)
*H02J 5/00*    (2016.01)
(Continued)

(52) U.S. Cl.
CPC ............ *H02J 5/005* (2013.01); *B60L 11/182* (2013.01); *B60L 11/1829* (2013.01); *B60L 11/1833* (2013.01); *B60L 11/1877* (2013.01); *B60L 11/1881* (2013.01); *H01F 38/14* (2013.01); *H02J 7/0042* (2013.01); *H02J 7/025* (2013.01); *H02J 50/12* (2016.02); *H02J 50/90* (2016.02); *B60L 2240/662* (2013.01);
(Continued)

(58) Field of Classification Search
CPC ..................................................... H02J 5/005
USPC ........................................................ 307/104
See application file for complete search history.

(56) References Cited

U.S. PATENT DOCUMENTS 7,741,734 B2    6/2010    Joannopoulos et al.
2007/0222542 A1    9/2007    Joannopoulos et al.
(Continued)

FOREIGN PATENT DOCUMENTS

AU    2006269374 B2    1/2007
AU    2006269374 C1    1/2007
(Continued)

*Primary Examiner* — Kenneth B Wells
(74) *Attorney, Agent, or Firm* — Oliff PLC

(57) ABSTRACT

A power receiving device includes: a power receiving unit that receives electric power from an externally provided power transmitting unit contactlessly; and a casing having the power receiving unit accommodated therein, the casing including: a lid member located on the power transmitting unit's side and allowing a magnetic field to pass therethrough, and a plurality of temperature sensors provided at the lid member and sensing in temperature a foreign matter present between the power transmitting unit and the power receiving unit, the temperature sensors being spaced closer together at the location of a strong portion of an electromagnetic field strength generated from the power receiving unit than the location of a weak portion of the electromagnetic field strength generated from the power receiving unit.

19 Claims, 28 Drawing Sheets

(51) Int. Cl.
*H02J 7/02* (2016.01)
*H01F 38/14* (2006.01)
*B60L 11/18* (2006.01)
*H02J 7/00* (2006.01)
*H02J 50/12* (2016.01)
*H02J 50/90* (2016.01)
*H01F 27/40* (2006.01)

(52) U.S. Cl.
CPC ....... *H01F 2027/406* (2013.01); *Y02T 10/705* (2013.01); *Y02T 10/7072* (2013.01); *Y02T 10/7291* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01); *Y02T 90/34* (2013.01)

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0074346 A1 | 3/2011 | Hall et al. |
| 2016/0064954 A1* | 3/2016 | Ibaragi ............ G01K 7/22 307/104 |
| 2016/0313188 A1* | 10/2016 | Ramzan ............ G01K 1/024 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2004-164882 A | 6/2004 |
| JP | 2009-501510 A | 1/2009 |
| JP | 2010-288429 A | 12/2010 |
| JP | 2011-050127 A | 3/2011 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2009/040998 A1 | 4/2009 |

* cited by examiner

POWER RECEIVING DEVICE AND POWER TRANSMITTING DEVICE

TECHNICAL FIELD

The present invention relates to a power receiving device and a power transmitting device.

BACKGROUND ART

Conventionally there have been known a power transmitting device contactlessly transmitting electric power and a power receiving device contactlessly receiving electric power. For example, U.S. Patent Application No. 2011/0074346 (PTD 1) describes a wireless power transfer device including a coil and a lid member covering the coil and having a temperature sensor attached thereto. When a foreign matter exists near the coil and serves as a cause to generate heat, the above configuration allows the presence of the foreign matter to be sensed.

CITATION LIST

Patent Document

PTD 1: U.S. Patent Application No. 2011/0074346

SUMMARY OF INVENTION

Technical Problem

In order to sense the presence of the foreign matter with sufficient precision, providing the coil covering lid with a large number of temperature sensors may be considered. While the large number of temperature sensors would allow the foreign matter to be sensed with improved precision, they will increase a cost that is required for the wireless power transfer device as a whole.

The present invention has been made in view of the above described issue, and contemplates a power receiving device and a power transmitting device that allow a foreign matter that is heated to high temperature to be sensed with good precision and that can also prevent increased cost.

Solution to Problem

The present invention provides a power receiving device comprising: a power receiving unit that receives electric power from an external power transmitting unit contactlessly; and a casing having the power receiving unit accommodated therein, the casing including a lid member located on the power transmitting unit's side and allowing a magnetic field to pass therethrough, and a plurality of temperature sensors provided at the lid member and sensing in temperature a foreign matter present between the power transmitting unit and the power receiving unit, the temperature sensors being spaced closer together at the location of a strong portion of an electromagnetic field strength generated from the power receiving unit than the location of a weak portion of the electromagnetic field strength generated from the power receiving unit.

In another embodiment: the power receiving unit includes a solenoid type coil unit; the coil unit has a tabular core, and a coil wound on a peripheral surface of the core about a winding axis; and the electromagnetic field strength has the strong portion in a direction transverse to the winding axis at a region having the core exposed in a vicinity of an end of the coil transverse to the winding axis.

In another embodiment: the power receiving unit includes an annular coil unit; the coil unit has a cylindrical core, and an annular coil wound on a peripheral surface of the core; and the coil unit presents an electromagnetic field strength such that the electromagnetic field strength generated from the power receiving unit has the strong portion at a center region of the coil.

In another embodiment, the temperature sensors are PTC thermistors, respectively.

In another embodiment, the PTC thermistors are connected in series.

In another embodiment: the PTC thermistors have two or more sensor groups each of a plurality of PTC thermistors connected in series; and the power receiving device has a sensor circuit that outputs a sense signal when the PTC thermistor included in any one of the sensor groups senses a temperature equal to or higher than a prescribed temperature.

In another embodiment: the power receiving unit is mounted in a vehicle; and the power receiving unit is provided with a drive mechanism capable of moving the power receiving unit toward the power transmitting unit to be adjacent thereto and moving the power receiving unit away from the power transmitting unit.

In another embodiment, the power transmitting unit and the power receiving unit have natural frequencies, respectively, with a difference smaller than or equal to 10% of the natural frequency of the power receiving unit.

In another embodiment, the power receiving unit and the power transmitting unit have a coupling coefficient equal to or smaller than 0.3.

In another embodiment, the power receiving unit receives electric power from the power transmitting unit through at least one of a magnetic field formed between the power receiving unit and the power transmitting unit and oscillating at a specific frequency and an electric field formed between the power receiving unit and the power transmitting unit and oscillating at a specific frequency.

The present invention provides a power transmitting device comprising: a power transmitting unit that contactlessly transmits electric power to a power receiving unit mounted in a vehicle; and a casing having the power transmitting unit accommodated therein, the casing including a lid member located on the power receiving unit's side and allowing an electromagnetic field to pass therethrough, and a plurality of temperature sensors provided at the lid member and sensing in temperature a foreign matter present between the power transmitting unit and the power receiving unit, the temperature sensors being spaced closer together at the location of a strong portion of an electromagnetic field strength generated from the power transmitting unit than the location of a weak portion of the electromagnetic field strength generated from the power transmitting unit.

In another embodiment: the power transmitting unit includes a solenoid type coil unit; the coil unit has a tabular core, and a coil wound on a peripheral surface of the core about a winding axis; and the electromagnetic field strength has the strong portion in a direction transverse to the winding axis at a region having the core exposed in a vicinity of an end of the coil transverse to the winding axis.

In another embodiment: the power transmitting unit includes an annular coil unit; the coil unit has a cylindrical core, and an annular coil wound on a peripheral surface of the core; and the coil unit presents an electromagnetic field strength such that the electromagnetic field strength generated from the power transmitting unit has the strong portion at a center region of the coil.

In another embodiment, the temperature sensors are PTC thermistors, respectively.

In another embodiment, the PTC thermistors are connected in series.

In another embodiment: the PTC thermistors have two or more sensor groups each of a plurality of PTC thermistors connected in series; and the power transmitting device has a sensor circuit that outputs a sense signal when the PTC thermistor included in any one of the sensor groups senses a temperature equal to or higher than a prescribed temperature.

In another embodiment, the power transmitting unit and the power receiving unit have natural frequencies, respectively, with a difference smaller than or equal to 10% of the natural frequency of the power receiving unit.

In another embodiment, the power receiving unit and the power transmitting unit have a coupling coefficient equal to or smaller than 0.3.

In another embodiment, the power transmitting unit receives electric power from the power transmitting unit through at least one of a magnetic field formed between the power receiving unit and the power transmitting unit and oscillating at a specific frequency and an electric field formed between the power receiving unit and the power transmitting unit and oscillating at a specific frequency.

Advantageous Effect of Invention

The present power receiving and transmitting devices allow a foreign matter that is heated to high temperature to be sensed with good precision, and can also prevent increased cost.

DESCRIPTION OF EMBODIMENTS

Reference will now be made to FIGS. 1-33 to describe a power transfer system, a vehicle, a power receiving device and a power receiving coil unit, and a power transmitting device and a power transmitting coil unit according to the present embodiment. Note that in the following embodiments when a number, an amount and the like are referred to, the present invention is not necessarily limited in range to that number, amount or the like unless otherwise indicated. Furthermore, identical and corresponding components are identically denoted and may not be described repeatedly. Furthermore, using the configurations of the embodiments in combination as appropriate is originally planned.

Furthermore, while the following embodiments are described with "magnetic field strength" focused on, a similar function and effect is also obtained with "electric field strength" or "electromagnetic field strength" focused on. Note that the present embodiment provides a power transfer system, which will more specifically be described later.

Figure 1:
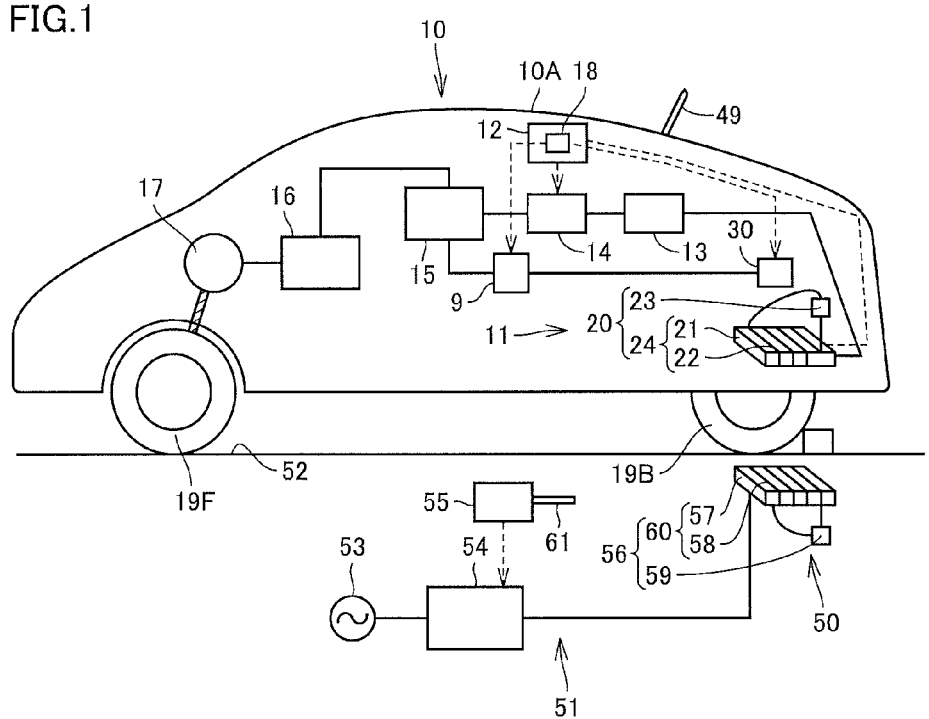
FIG. 1 schematically shows a power transfer system, a vehicle, a power receiving device, and a power transmitting device according to an embodiment.

FIG. 1 is a schematic view of a power transfer system, a vehicle, a power receiving device, a power transmitting device and the like according to the present embodiment.

The power transfer system according to a first embodiment has an electrically driven vehicle 10 including a power receiving device 11, and an external power feeding apparatus 51 including a power transmitting device 50. Power receiving device 11 of electrically driven vehicle 10 mainly receives electric power from power transmitting device 50.

A parking space 52 is provided with a wheel block and a line indicating a parking position and a parking area to allow electrically driven vehicle 10 to be stopped at a prescribed position.

External power feeding apparatus 51 includes a high-frequency power driver 54 connected to an alternate current (ac) power supply 53, a control unit 55 controlling high-frequency power driver 54 and the like drivably, power transmitting device 50 connected to high-frequency power driver 54, and an antenna 61 communicating information with electrically driven vehicle 10.

Power transmitting device 50 includes a power transmitting unit 56, and power transmitting unit 56 includes a solenoid-type, primary coil unit 60 and a primary capacitor 59 connected to primary coil unit 60. Primary coil unit 60 includes a primary ferrite core 57 and a primary coil (or a first coil) 58 wound on primary ferrite core 57. Primary coil 58 is connected to high-frequency power driver 54. Note that when any primary coil is referred to in the present embodiment, the primary coil is primary coil 58.

In FIG. 1, electrically driven vehicle 10 includes a vehicular body 10A, power receiving device 11 provided to vehicular body 10A, a rectifier 13 connected to power receiving device 11, and a DC/DC converter 14 connected to rectifier 13. Electrically driven vehicle 10 includes a battery 15 connected to DC/DC converter 14, a power control unit (PCU) 16, a motor unit 17 connected to power control unit 16, a vehicular electronic control unit (ECU) 12 that controls DC/DC converter 14, power control unit 16 and the like drivably, a drive mechanism 30, and an adjustment unit 9. Electrically driven vehicle 10 includes an antenna 49 communicating information with external power feeding apparatus 51. Vehicular body 10A includes a body having an engine compartment, a cabin compartment and the like formed therein, and an exterior component such as a fender provided to the body. Electrically driven vehicle 10 includes a front wheel 19F and a rear wheel 19B.

Note that while in the present embodiment a hybrid vehicle including an engine 47 will be described as one example of electrically driven vehicle 10, the present invention is not limited to such a vehicle. For example, the present invention is also applicable to an electric vehicle excluding an engine, a fuel cell vehicle including a fuel cell in place of an engine, and the like.

Rectifier 13 is connected to power receiving device 11, and receives an alternating current from power receiving device 11, converts the received alternating current into a direct current and supplies the direct current to DC/DC converter 14.

DC/DC converter 14 receives the direct current from rectifier 13, adjusts the received direct current in voltage, and supplies it to battery 15. Note that DC/DC converter 14 is not essential and may be dispensed with. In that case, providing external power feeding apparatus 51 with a matching device between power transmitting device 50 and high-frequency power driver 54 for matching impedance can replace DC/DC converter 14.

Power control unit 16 includes a converter connected to battery 15 and an inverter connected to the converter, and the converter adjusts (or boosts) a direct current supplied from battery 15 and supplies the direct current to the inverter. The inverter receives the direct current from the converter, converts the direct current into an alternating current, and supplies the alternating current to motor unit 17.

Motor unit 17 is for example a three-phase AC motor or the like, and motor unit 17 is driven by the alternating current supplied from the inverter of power control unit 16.

Power receiving device 11 includes a power receiving unit 20. Power receiving unit 20 includes a solenoid-type, secondary coil unit 24 and a secondary capacitor 23 connected to secondary coil unit 24. Secondary coil unit 24 includes a secondary ferrite core 21 and a secondary coil (or a second coil) 22 wound on secondary ferrite core 21. Note that power receiving unit 20 also does not include secondary capacitor 23 as an essential component. Secondary coil 22 is connected to rectifier 13. Note that when any secondary coil is referred to in the present embodiment, it refers to secondary coil 22.

Figure 2:
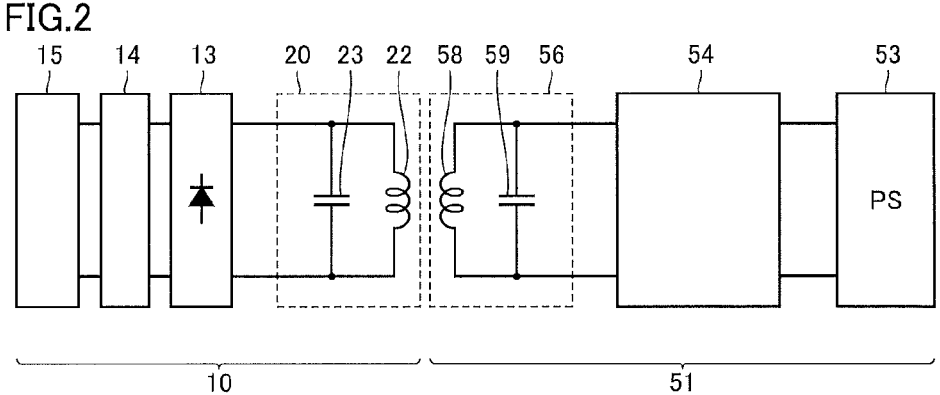
FIG. 2 is an electric circuit diagram allowing the FIG. 1 power transfer system to implement contactless power transfer.

FIG. 2 is an electric circuit diagram allowing the FIG. 1 power transfer system to implement contactless power transfer. Note that the FIG. 2 circuit configuration is merely one example, and contactless power transfer may be implemented in a configuration other than that shown in FIG. 2.

Secondary coil 22 cooperates with secondary capacitor 23 to form a resonant circuit, and contactlessly receives electric power transmitted from power transmitting unit 56 of external power feeding apparatus 51. Note that, although not shown in the figure, secondary coil 22 and secondary capacitor 23 may form a closed loop, and the ac power that is received by secondary coil 22 may be extracted from secondary coil 22 by a separately provided coil through electromagnetic induction and output thereby to rectifier 13.

Primary coil 58 cooperates with primary capacitor 59 to form a resonant circuit, and contactlessly transmits ac power that is supplied from AC power supply 53 to power receiving unit 20 contactlessly. Note that, although not shown in the figure, primary coil 58 and primary capacitor 59 may form a closed loop, and the ac power that is output from AC power supply 53 may be supplied via a separately provided coil through electromagnetic induction to primary coil 58.

Note that primary and secondary capacitors 59 and 23 are provided to each adjust its respective resonant circuit's natural frequency, and primary and secondary capacitors 59 and 23 may be dispensed with if a desired natural frequency is obtained via a stray capacitance of primary coil 58 and secondary coil 22.

Figure 3:
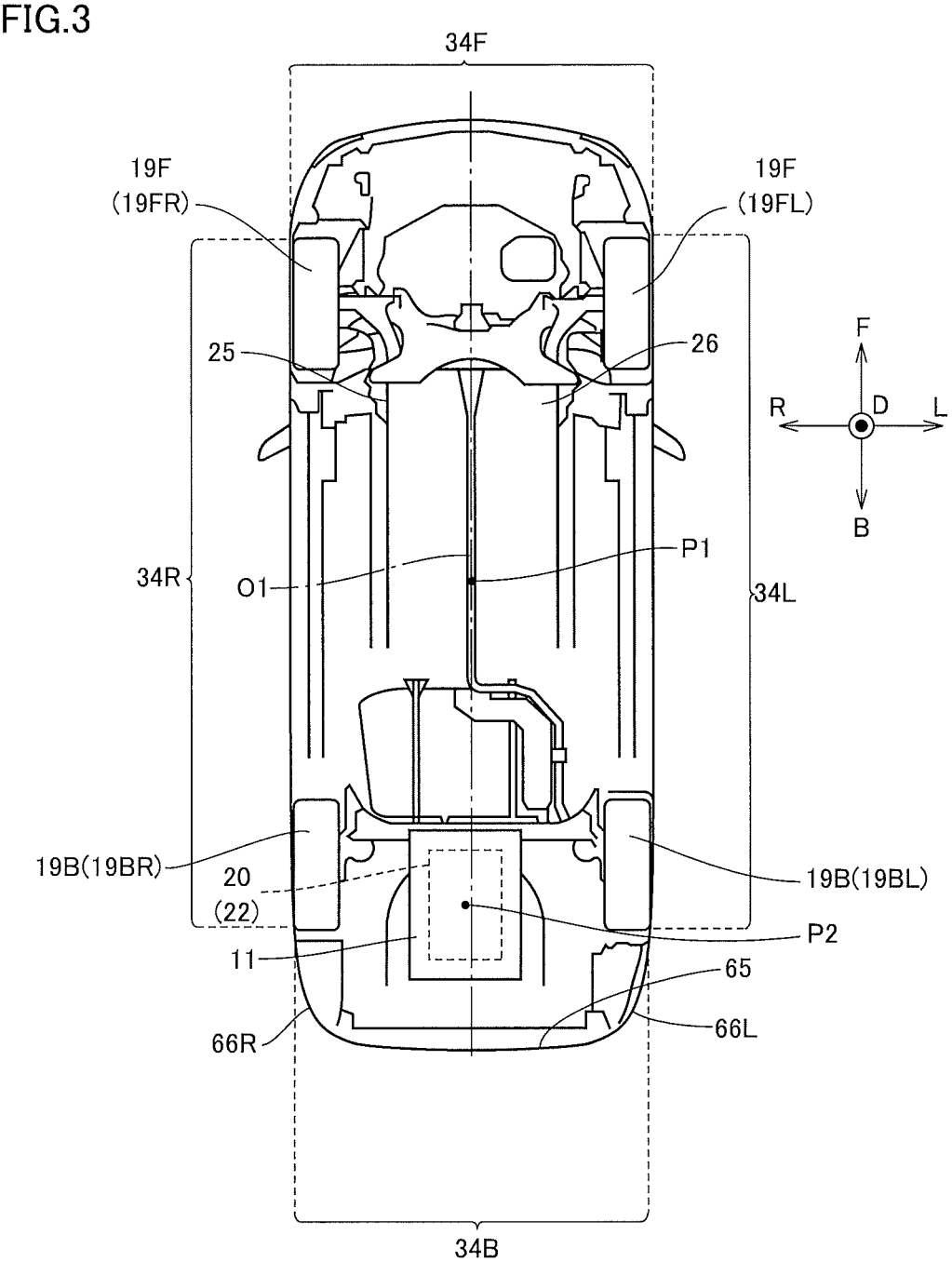
FIG. 3 is a bottom view of the vehicle at a bottom surface.

FIG. 3 is a bottom view of electrically driven vehicle 10 at a bottom surface 25. In FIG. 3, "D" denotes a vertically downward direction D. "L" denotes a leftward direction L relative to the vehicle. "R" denotes a rightward direction R relative to the vehicle. "F" denotes a frontward direction F relative to the vehicle. "B" denotes a rearward direction B relative to the vehicle. Bottom surface 25 of electrically driven vehicle 10 (or vehicular body 10A) is a surface of electrically driven vehicle 10 that can be observed at a position distant from electrically driven vehicle 10 in the vertically downward direction with electrically driven vehicle 10 having its tires in contact with the ground surface. Power receiving device 11, power receiving unit 20, and secondary coil 22 are provided at bottom surface 25.

Bottom surface 25 has a center denoted as P1 for the sake of illustration. Center P1 is located at a center of electrically driven vehicle 10 as seen lengthwise and is also located at a center of electrically driven vehicle 10 as seen widthwise.

Vehicular body 10A includes a floor panel 26 provided at the bottom surface of electrically driven vehicle 10. Floor panel 26 is a tabular member delimiting the vehicle's interior and exterior.

Note that providing power receiving device 11 at bottom surface 25 includes attaching the device directly to floor panel 26, suspending the device from floor panel 26, a side member, a cross member or the like, and the like.

Note that providing power receiving unit 20, secondary coil 22 and the like at bottom surface 25 means accommodating them in a casing, which will be described hereinafter, of power receiving device 11 with power receiving device 11 provided at bottom surface 25.

Front wheel 19F is provided closer to the vehicle's front side than center P1. Front wheel 19F includes a right front wheel 19FR and a left front wheel 19FL aligned in the widthwise direction of vehicle 10. Rear wheel 19B includes a right rear wheel 19BR and a left rear wheel 19BL aligned in the widthwise direction of vehicle 10.

Bottom surface 25 has a peripheral portion including a front peripheral portion 34F, a rear peripheral portion 34B, a right peripheral portion 34R, and a left peripheral portion 34L. Front peripheral portion 34F is a portion of the peripheral portion of bottom surface 25 that is located closer to the vehicle's front side than right front wheel 19FR and left front wheel 19FL.

Rear peripheral portion 34B is a portion of the peripheral portion of bottom surface 25 that is located closer to the vehicle's rear side than right rear wheel 19BR and left rear wheel 19BL.

Rear peripheral portion 34B extends in the widthwise direction of electrically driven vehicle 10, and includes a right rear side portion 66R connected to one end of rear peripheral portion 34B, and a left rear side portion 66L connected to the other end of rear peripheral portion 34B. Right rear side portion 66R extends from one end of rear peripheral portion 34B towards right rear wheel 19BR, and left rear side portion 66L extends from the other end of rear peripheral portion 34B towards left rear wheel 19BL.

Right peripheral portion 34R and left peripheral portion 34L are aligned in the widthwise direction of electrically driven vehicle 10. Right peripheral portion 34R and left peripheral portion 34L are portions of the peripheral portion of bottom surface 25 that are located between front peripheral portion 34F and rear peripheral portion 34B.

Figure 4:
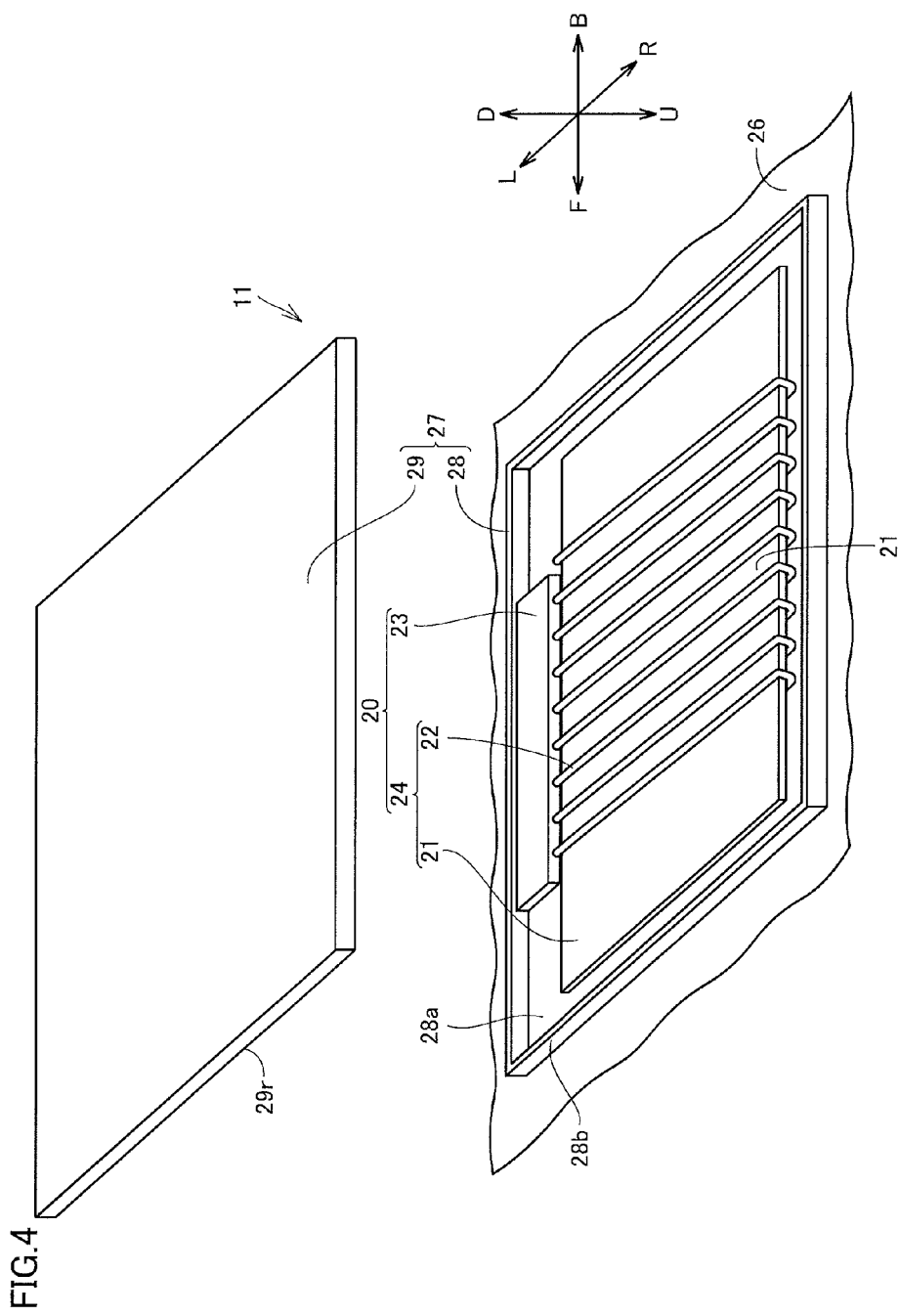
FIG. 4 is an exploded perspective view of the power receiving device provided at the vehicle.
Figure 5:
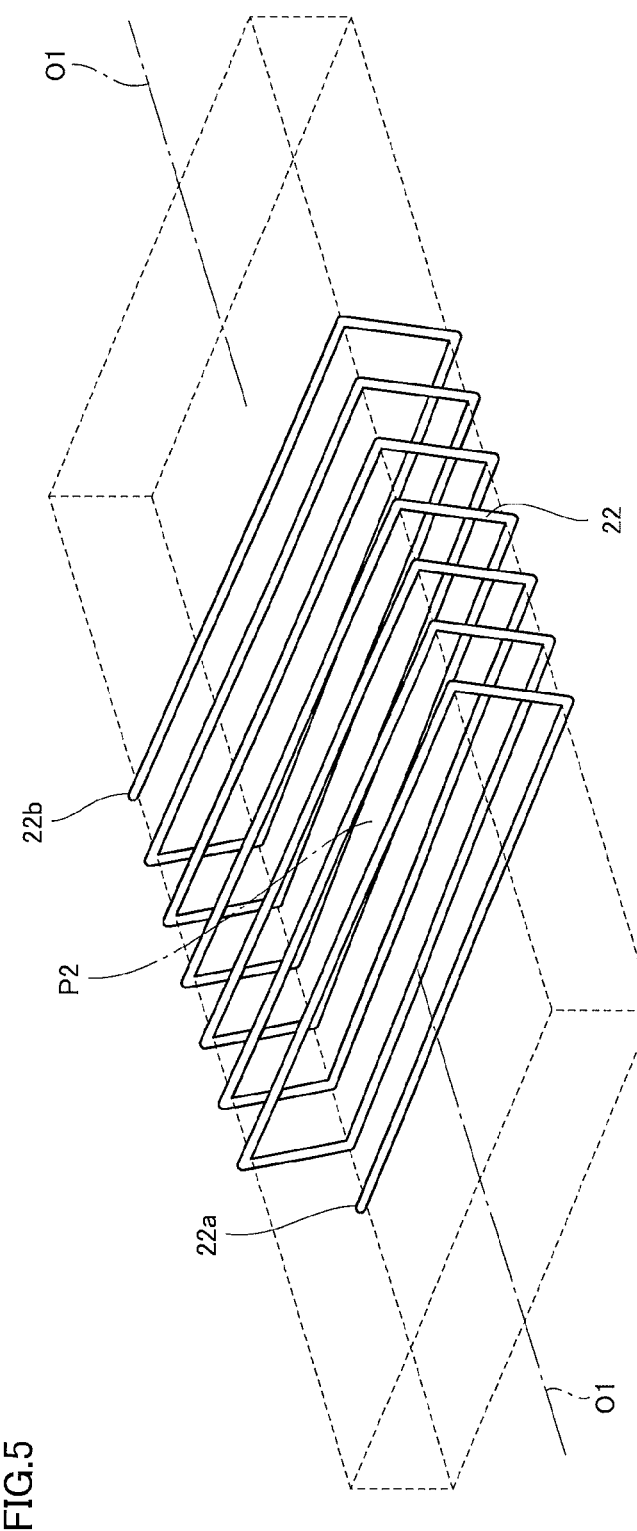
FIG. 5 is a schematic perspective view of how a secondary coil is wound.
Figure 6:
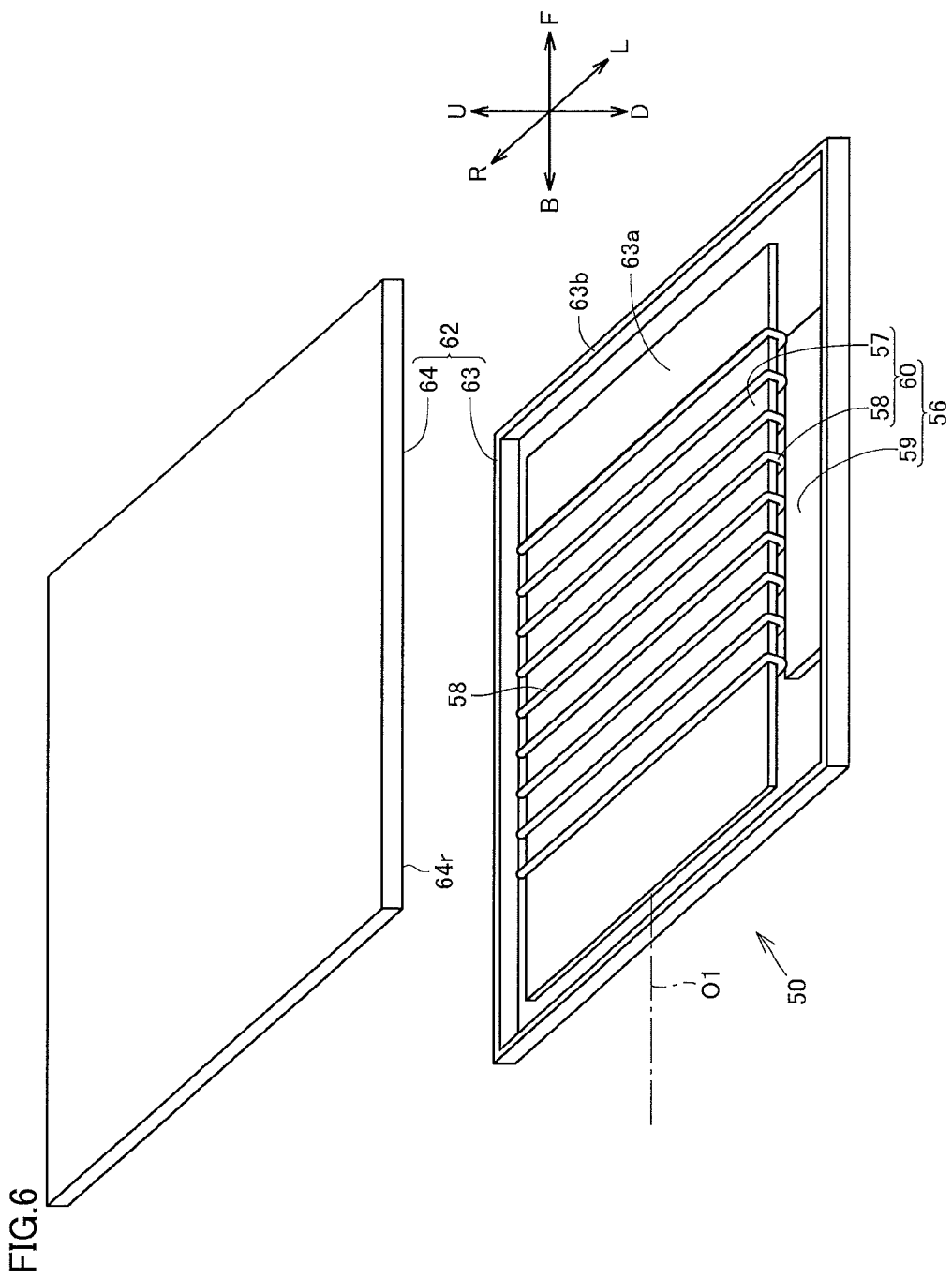
FIG. 6 is an exploded perspective view of the power transmitting device.

FIG. 4 is an exploded perspective view of power receiving device 11 provided at electrically driven vehicle 10. Note that the figure shows a coil wire wound with a larger spacing than an actually applied spacing to help to understand how it is wound in reality. FIG. 5 and FIG. 6 referred to hereinafter are also similarly presented. Furthermore, FIG. 4 shows top and bottom upside down. Power receiving device 11 includes power receiving unit 20 and a casing 27 associated with a secondary side and accommodating power receiving unit 20 therein. The secondary side's casing 27 includes a bottomed shield 28 associated with the secondary side and having an opening, and a lid member 29 associated with the secondary side, and provided in the form of a flat plate and disposed to close the opening of the secondary side's shield 28.

The secondary side's shield 28 includes a top 28a facing floor panel 26, and an enclosing peripheral wall 28b extending from the top in vertically downward direction D. The secondary side's shield 28 is formed of a metallic material such as copper for example. The secondary side's lid member 29 is provided in the form of a flat plate to close the opening of the secondary side's shield 28, and it is formed for example of resin material or the like.

Secondary coil unit 24 has secondary ferrite core 21 and secondary coil 22. Secondary ferrite core 21 is provided in the form of a plate. Secondary ferrite core 21 has a peripheral surface with secondary coil 22 wound thereon. Note that secondary ferrite core 21 may be accommodated in a fixed member of resin and secondary coil 22 be wound on a peripheral surface of the fixed member and thus attached to secondary ferrite core 21.

FIG. 5 is a schematic perspective view of how secondary coil 22 is wound. As shown in FIG. 5, secondary coil 22 includes a first end 22a and a second end 22b. Secondary coil 22 is formed such that, as seen from first end 22a to second end 22b, a coil wire surrounds a winding axis O1 and is also displaced therealong.

Winding axis O1 is an imaginary line approximated so that when the coil wire is divided into small sections the imaginary line passes through or near a center of curvature in each small section.

In the present embodiment, secondary coil 22 has a center P2, which is an imaginary point located on winding axis O1 and is located at a center of secondary coil 22 as seen along winding axis O1.

Power receiving unit 20 (or power receiving device 11) thus configured is disposed such that winding axis O1 extends in the fore-aft direction of electrically driven vehicle 10 and winding axis O1 passes through front peripheral portion 34F and rear peripheral portion 34B, as shown in FIG. 3.

Power receiving unit 20 (or power receiving device 11) is disposed to be closer to the vehicle's rear side than center P1. More specifically, it is provided at a position closer to rear peripheral portion 34B than center P1. Center P2 is positioned to be closer to rear peripheral portion 34B than any other one of front peripheral portion 34F, right peripheral portion 34R, and left peripheral portion 34L.

FIG. 6 is an exploded perspective view of power transmitting device 50 provided in parking space 52. Power transmitting device 50 includes power transmitting unit 56 and a casing 62 associated with a primary side and accommodating power transmitting unit 56 therein. The primary side's casing 62 includes a bottomed shield 63 associated with the primary side and having an opening, and a lid member 64 associated with the primary side, and provided in the form of a flat plate and disposed to close the opening of the primary side's shield 63.

The primary side's shield 63 includes a top 63a located in parking space 52, and an enclosing peripheral wall 63b that is erect from top 63a in vertically upward direction U. The primary side's shield 63 is formed of a metallic material such as copper for example. The primary side's lid member 64 is provided in the form of a flat plate to close the opening of the primary side's shield 63, and it is formed for example of resin material or the like.

In the present embodiment, the primary side's lid member 64 at an internal surface 64r thereof facing primarily coil unit 60 is provided with a plurality of temperature sensors to sense whether primarily coil unit 60 is increased in temperature. This will be described in detail hereinafter.

Primarily coil unit 60 has primary ferrite core 57 and primary coil 58. Primary ferrite core 57 is provided in the form of a plate. Primary ferrite core 57 has a peripheral surface with primary coil 58 wound thereon. Note that primary ferrite core 57 may be accommodated in a fixed member of resin and primary coil 58 be wound on a peripheral surface of the fixed member and thus attached to primary ferrite core 57. How primary coil 58 is wound on primary ferrite core 57 is the same as described for secondary coil unit 24 (see FIG. 5).

Power transmitting unit 56 (or power transmitting device 50) thus configured is disposed such that winding axis O1 extends in the fore-aft direction of electrically driven vehicle 10, as shown in FIG. 3.

When power receiving unit 20 and power transmitting unit 56 transfer electric power therebetween, power receiving unit 20 and power transmitting unit 56 face each other as seen vertically. Note that while in the present embodiment power receiving unit 20 and power transmitting unit 56 are substantially equally sized, power transmitting unit 56 may be formed to be larger than power receiving unit 20.

Figure 7:
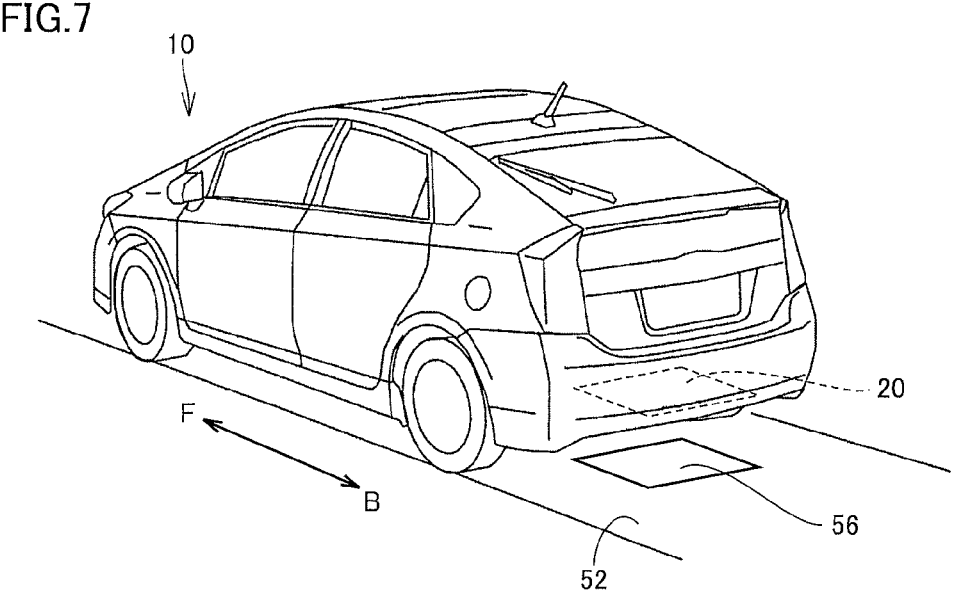
FIG. 7 is a perspective view of the vehicle stopped with the power transmitting unit and the power receiving unit facing each other.
Figure 8:
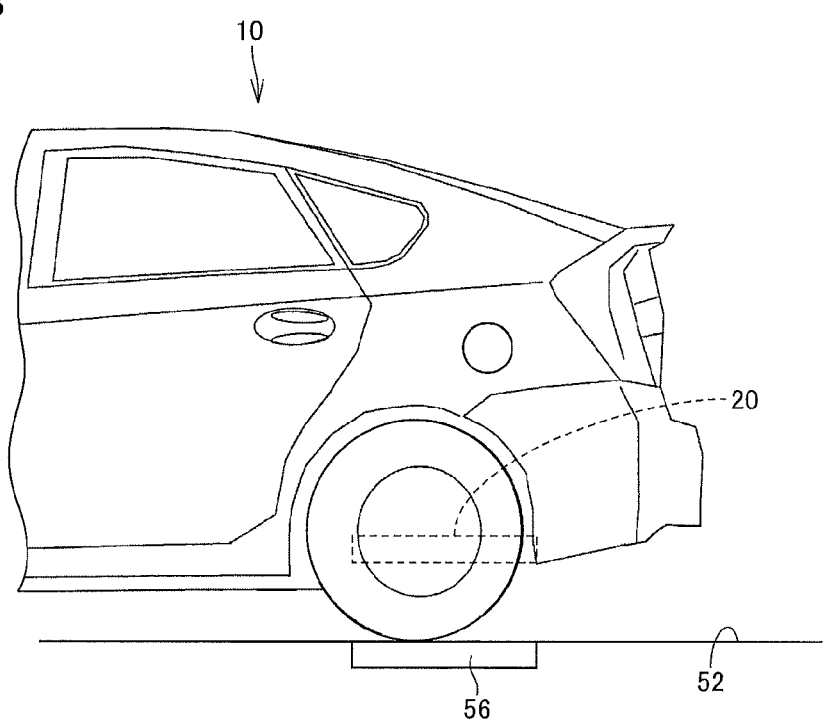
FIG. 8 is a side view of a portion of the vehicle with the power receiving unit and the power transmitting unit facing each other.

FIG. 7 is a perspective view of electrically driven vehicle 10 stopped with power transmitting unit 56 and power receiving unit 20 facing each other, and FIG. 8 is a side view of a portion of electrically driven vehicle 10 with power transmitting unit 56 and power receiving unit 20 facing each other.

As shown in FIG. 8, electrically driven vehicle 10 is parked in parking space 52 such that power receiving unit 20 is positioned over power transmitting unit 56. In the present embodiment, electrically driven vehicle 10 is moved by a driver in vehicular frontward direction F or vehicular rearward direction B to position power receiving unit 20 over power transmitting unit 56. Thus, electrically driven vehicle 10 is parked such that power receiving unit 20 and power transmitting unit 56 face each other.

Magnetic Field Strength of Power Transmitting Unit 56

Figure 9:
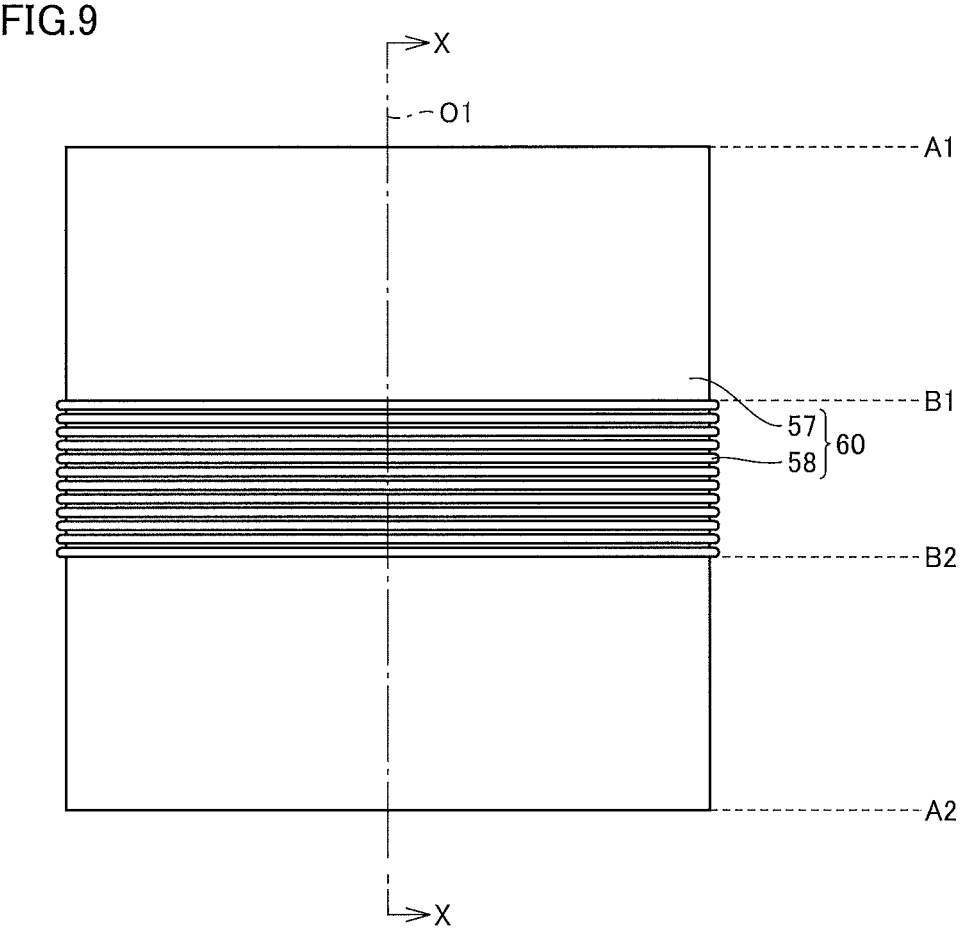
FIG. 9 is a plan view of a primary coil wound on a primary ferrite core.
Figure 10:
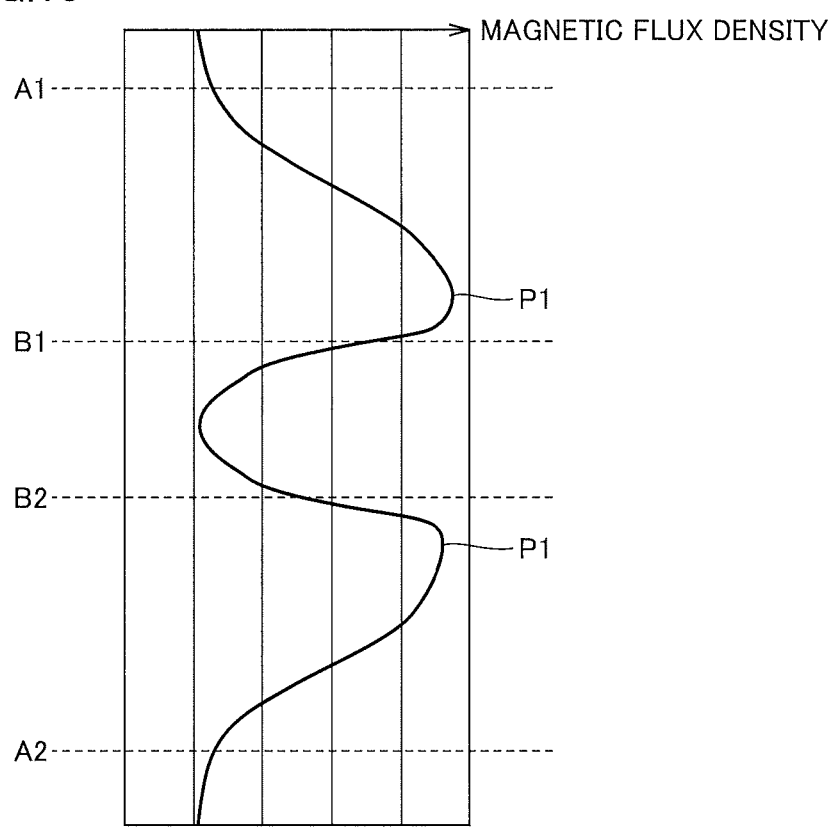
FIG. 10 represents a magnetic flux distribution provided at a surface of a primary coil unit taken along an arrow-headed line X-X shown in FIG. 9, and seen in a direction indicated by the line.

Reference will now be made to FIG. 9 and FIG. 10 to describe magnetic field strength at a surface of primarily coil unit 60. FIG. 9 is a plan view of primary coil 58 wound on primary ferrite core 57 and FIG. 10 represents a magnetic flux distribution provided at a surface of primary coil unit 60 taken along an arrow-headed line X-X shown in FIG. 9, and seen in a direction indicated by the line.

As shown in FIG. 9, when primary coil 58 is wound on primary ferrite core 57, then, as shown in FIG. 10, primarily coil unit 60 has a surface with a magnetic flux distribution, as seen along winding axis O1, in a region having primary coil 58 wound therein (i.e., a region B1-B2) lower at a center of the region and higher toward an end of primary coil 58 that is traversed by winding axis O1.

A region that does not have primary coil 58 wound thereon and thus has primarily ferrite core 57 exposed (i.e., a region A1-B1 and a region A2-B2) has a magnetic flux distribution having a largest value (P1) in a vicinity of the end of primary coil 58 that is traversed by winding axis O1, and the region has a magnetic flux distribution decreased toward an end of primary ferrite core 57 that is traversed by winding axis O1.

Secondary coil unit 24 also presents the same magnetic flux distribution as primarily coil unit 60.

Heat Generation Evaluation 1

Figure 11:
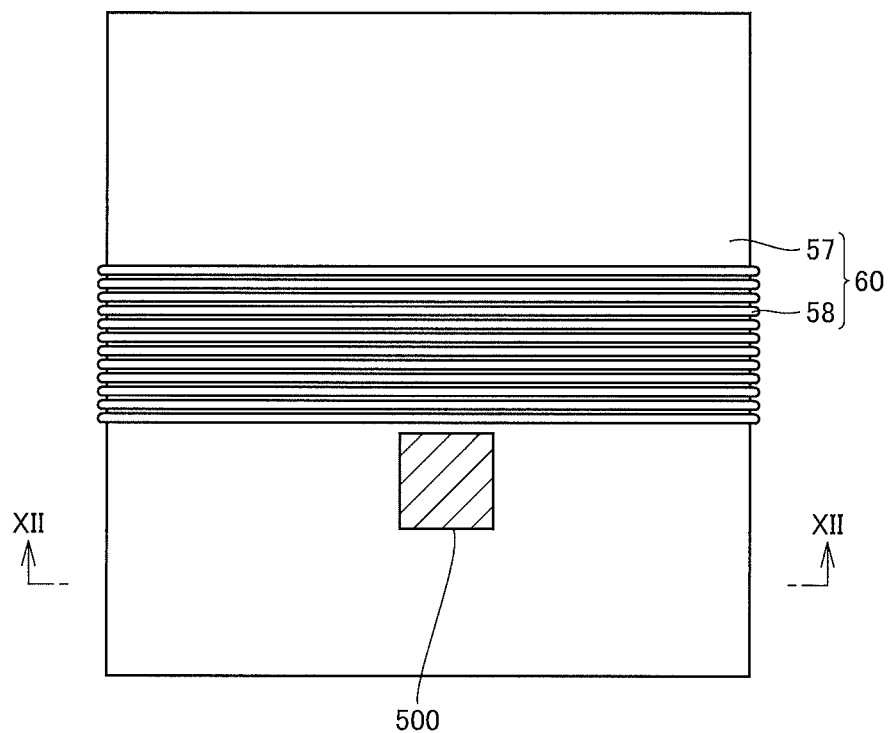
FIG. 11 is a plan view showing an iron plate disposed at a position a prescribed distance away from a surface of the ferrite core of the primary coil unit for a heat generation evaluation 1.
Figure 12:
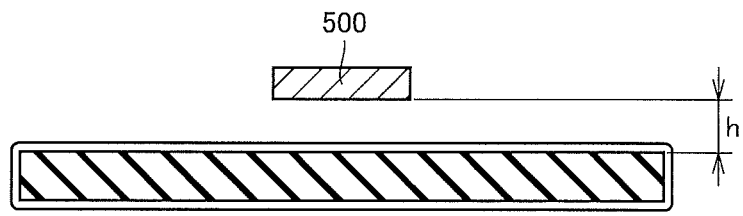
FIG. 12 is a cross section taken along an arrow-headed line XII-XII indicated in FIG. 11, and seen in a direction indicated by the line.
Figure 13:
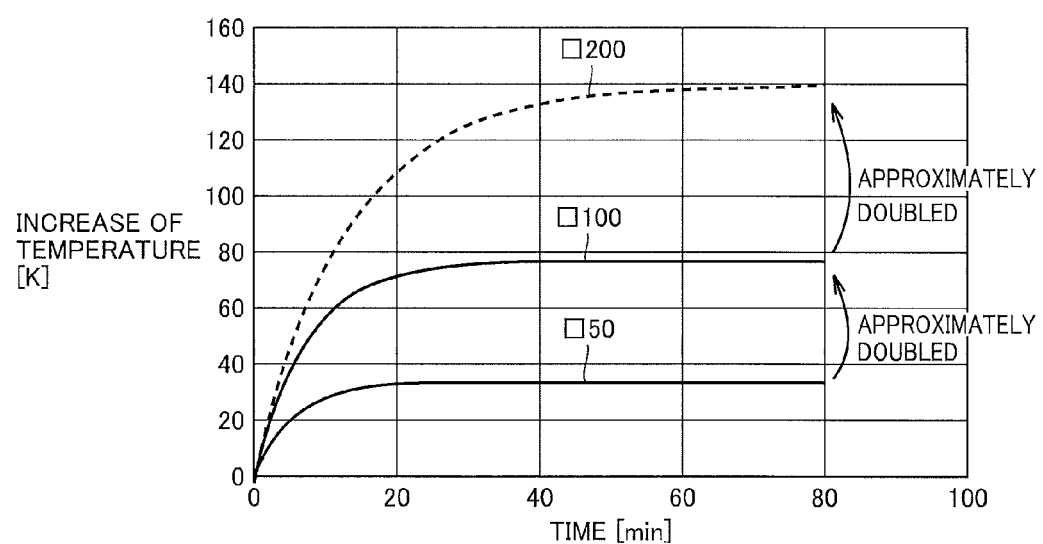
FIG. 13 represents a relationship between the iron plate's size and how its temperature rises for heat generation evaluation 1, the iron plate being disposed at a position a prescribed distance away from the surface of the ferrite core of the primary coil unit.

Hereinafter reference will be made to FIGS. 11-13 to describe a heat generation evaluation 1 of primarily coil unit 60. FIG. 11 is a plan view showing an iron plate 500 disposed at a position a prescribed distance away from a surface of primary ferrite core 57 of primary coil unit 60 for heat generation evaluation 1, and FIG. 12 is a cross section taken along an arrow-headed line XII-XII indicated in FIG. 11, and seen in a direction indicated by the line. FIG. 13 represents a relationship between iron plate 500 in size and how its temperature rises for heat generation evaluation 1, iron plate 500 being disposed at a position a prescribed distance away from the surface of primary ferrite core 57 of primary coil unit 60.

Iron (or Fe) plate 500 was prepared to have three sizes: a size 1 [50 mm×50 mm, and a thickness of 3 mm]; a size 2 [100 mm×100 mm, and a thickness of 3 mm]; and a size 3 [200 mm×200 mm, and a thickness of 3 mm] Plate 500 was disposed at a height (h) providing a distance of 10 mm from a surface of primary ferrite core 57 to a surface of plate 500 that is opposite thereto. Furthermore, plate 500 was disposed to have a center at a position that matches a position allowing the magnetic flux distribution to have largest value (P1), as shown in FIG. 10.

A prescribed output condition was applied and how plate 500 generated heat was thus evaluated, and it has been confirmed that plate 500 increased in area four times provided an approximately doubled saturation temperature. Secondary coil unit 24 also presents the same saturation temperature distribution as primarily coil unit 60.

Heat Generation Evaluation 2

Figure 14:
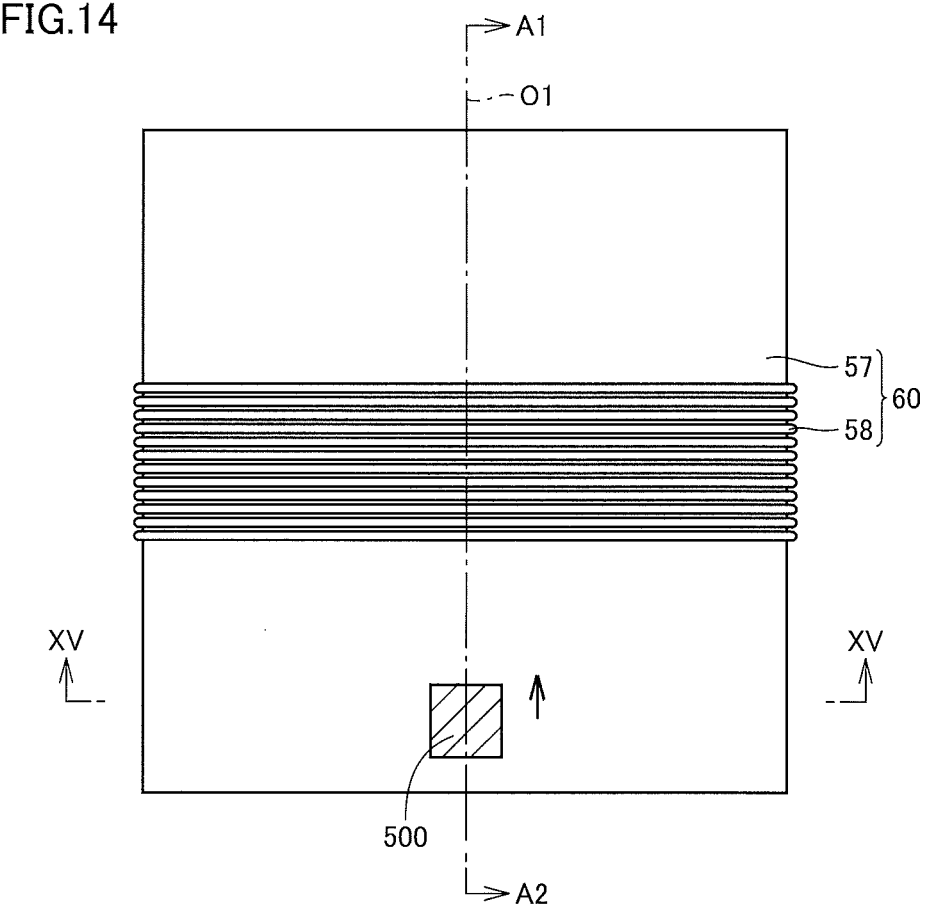
FIG. 14 is a plan view showing an iron plate disposed at a position a prescribed distance away from the surface of the ferrite core of the primary coil unit for a heat generation evaluation 2.
Figure 15:
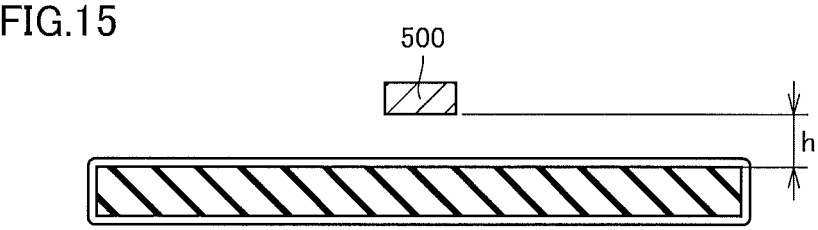
FIG. 15 is a cross section taken along an arrow-headed line XIV-XIV indicated in FIG. 14, and seen in a direction indicated by the line.
Figure 16:
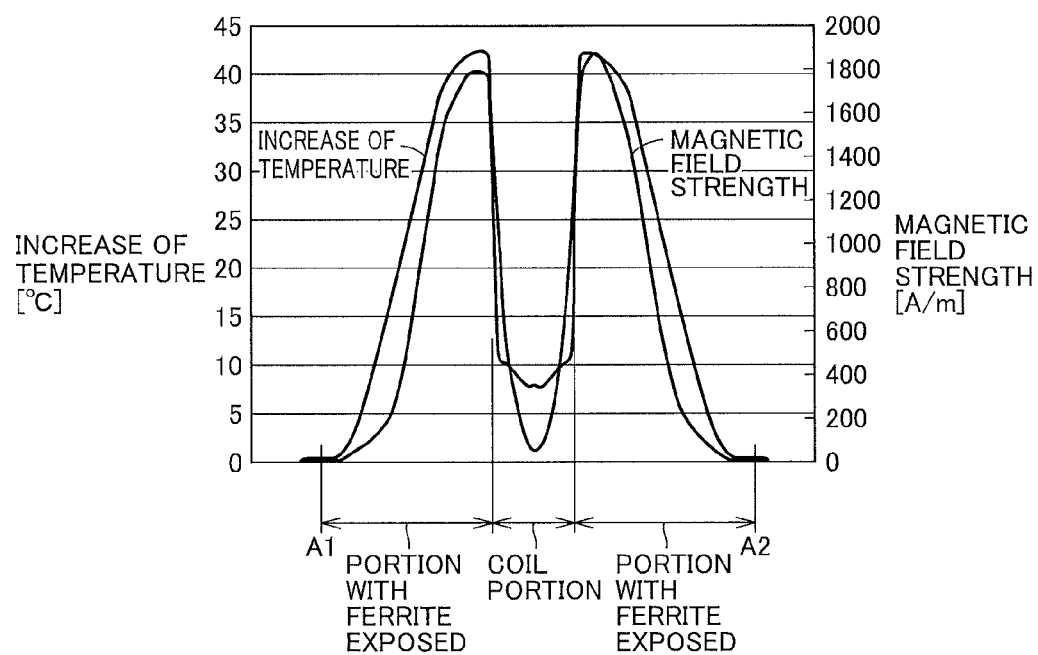
FIG. 16 represents a relationship between the iron plate's position and magnetic field strength for heat generation evaluation 2, the iron plate being disposed at a position a prescribed distance away from the surface of the primary ferrite core of the primary coil unit and moved along a winding axis.

Hereinafter reference will be made to FIGS. 14-16 to describe a heat generation evaluation 2 of primarily coil unit 60, FIG. 14 is a plan view showing iron plate 500 disposed at a position a prescribed distance away from a surface of primary ferrite core 57 of primary coil unit 60 and moved along winding axis O1 for heat generation evaluation 2, FIG. 15 is a cross section taken along an arrow-headed line XIV-XIV indicated in FIG. 14, and seen in a direction indicated by the line, and FIG. 16 represents a relationship between iron plate 500 in position and magnetic field strength for heat generation evaluation 2, iron plate 500 being disposed at a position a prescribed distance away from the surface of primary ferrite core 57 of primary coil unit 60 and moved along winding axis O1.

Iron (Fe) Plate 500 was 20 mm×20 mm and had a thickness of 1.8 mm. Plate 500 was disposed at a height (h) providing a distance of 10 mm from a surface of primary ferrite core 57 to a surface of plate 500 that is opposite thereto. Furthermore, plate 500 had a center moved along winding axis O1.

As shown in FIG. 16, a prescribed output condition was applied and how plate 500 generated heat was thus evaluated, and it has been confirmed that plate 500 was increased in temperature in proportion to magnetic field strength. Secondary coil unit 24 also presents the same saturation temperature distribution as primarily coil unit 60.

Arrangement of Temperature Sensor 100

Figure 17:
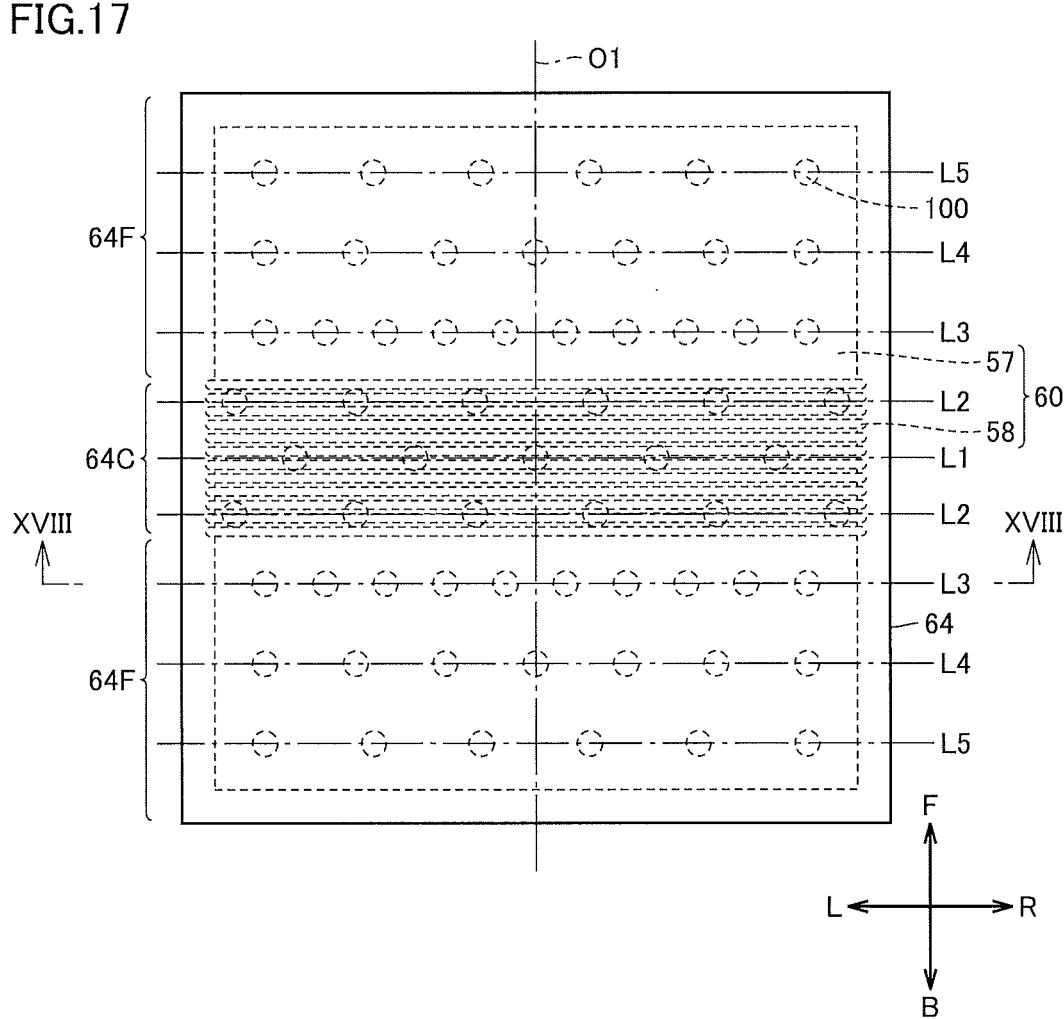
FIG. 17 is a plan view of a primary side's lid member provided with a temperature sensor provided for the power transmitting device in an embodiment.
Figure 18:
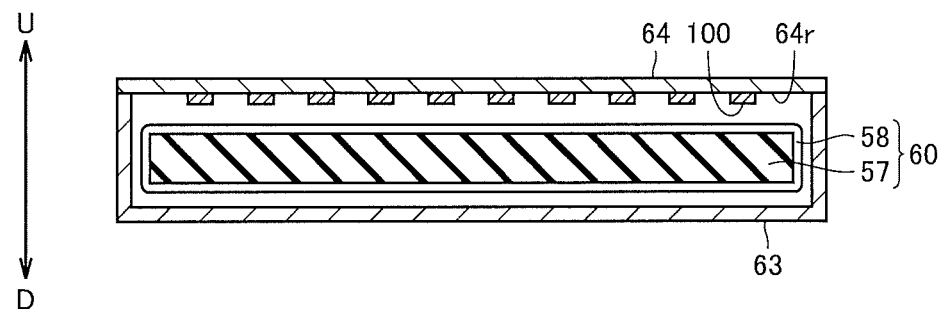
FIG. 18 is a cross section taken along an arrow-headed line XVIII-XVIII indicated in FIG. 17, and seen in a direction indicated by the line.
Figure 19:
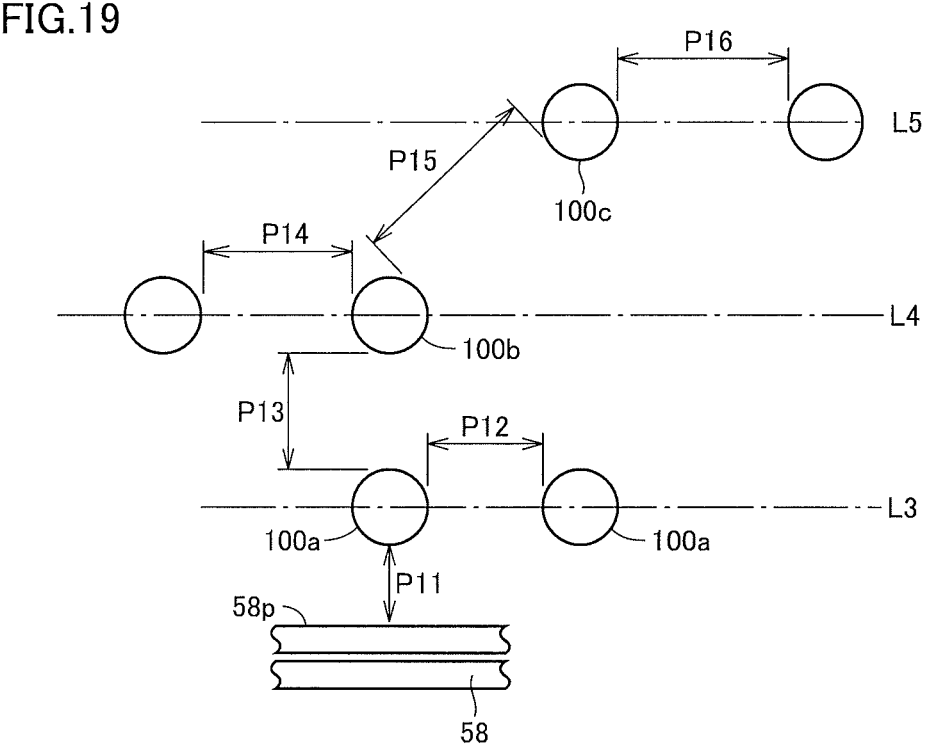
FIG. 19 is a schematic diagram for illustrating how the temperature sensor is disposed so that temperature sensors closer to a coil provide a denser temperature sensing range.

Reference will now be made to FIG. 17 to FIG. 22 to describe how temperature sensor 100 is disposed on the primary side's lid member 64 at internal surface 64r facing primarily coil unit 60. FIG. 17 is a plan view of the primary side's lid member 64 provided with temperature sensor 100 provided for power transmitting device 50 in the present embodiment, FIG. 18 is a cross section taken along an arrow-headed line XVIII-XVIII indicated in FIG. 17, and seen in a direction indicated by the line, and FIG. 19 is a schematic diagram for illustrating how temperature sensor 100 is disposed so that temperature sensors closer to the primary coil provide a denser temperature sensing range.

Primarily coil unit 60 has a surface with a magnetic field strength as shown in FIG. 10, and accordingly, the primary side's lid member 64 of resin is penetrated by a magnetic field. Furthermore, as shown in FIG. 13, iron plate 500 having a larger area increases in temperature by a larger extent, and furthermore, as shown in FIG. 16, it has been confirmed that the plate increases in temperature in proportion to magnetic field strength.

Accordingly, in the present embodiment, temperature sensor 100 is disposed on the primary side's lid member 64 at internal surface 64r facing primarily coil unit 60, in such a manner that a region experiencing a largest magnetic field strength generated from primarily coil unit 60 is subject to a densest temperature sensing range and a region farther away from the region experiencing the largest magnetic field strength generated from primarily coil unit 60 is subject to a sparser temperature sensing range.

FIG. 17 and FIG. 18 show a specific example. As has been shown in FIG. 10, primarily coil unit 60 has a surface with a magnetic field strength, as seen along winding axis O1, in a region having primary coil 58 wound therein (i.e., region B1-B2) lower at a center of the region and higher toward an end of primary coil 58 that is traversed by winding axis O1.

The primary side's lid member 64 has a region 64C facing the region having primary coil 58 wound therein, and the primary side's lid member 64 is provided with temperature sensor 100 in region 64C to have a sparse temperature sensing range in region 64C at a portion that corresponds to a center portion of primary coil 58 in a direction transverse to winding axis O1 (or along a line L1 in the figure). In the present embodiment, five temperature sensors 100 are disposed along a line L1. The five temperature sensors 100 are spaced to be equal in pitch.

The primary side's lid member 64 is then provided with temperature sensor 100 in region 64C to have a temperature sensing range along the end portion of primary coil 58 traversed by winding axis O1 (or along a line L2 in the figure), that is denser than that along line L1 for the center portion. In the present embodiment, six temperature sensors 100 are disposed along line L2. The six temperature sensors 100 are spaced to be equal in pitch.

The primary side's lid member 64 is then provided with temperature sensor 100 in a region corresponding to the regions that do not have primary coil 58 wound therein and thus have primarily ferrite core 57 exposed (i.e., regions A1-B1 and A2-B2), along a region experiencing a magnetic field strength of the largest value (P1) (or along a line L3 in the figure), to have a denser temperature sensing range than that along line L2. In the present embodiment, 10 temperature sensors 100 are disposed along line L3. The ten temperature sensors 100 are spaced to be equal in pitch. The region on line L3 experiences the largest magnetic field strength, and accordingly, the temperature sensing range on line L3 will be denser than any other ranges of the other regions.

The primary side's lid member 64 is then provided with temperature sensor 100 in the region corresponding to the regions having primarily ferrite core 57 exposed (i.e., regions A1-B1 and A2-B2), along a line L4 opposite to (or outer than) line L2 with line L3 posed therebetween, to have a sparser temperature sensing range than that along line L3. In the present embodiment, seven temperature sensors 100 are disposed along line L4. The seven temperature sensors 100 are spaced to be equal in pitch.

Furthermore, the primary side's lid member 64 is provided with temperature sensor 100 in the region corresponding to the regions having primarily ferrite core 57 exposed (i.e., regions A1-B1 and A2-B2), along a line L5 opposite to (or outer than) line L3 with line L4 posed therebetween, to have a sparser temperature sensing range than that along line L4. In the present embodiment, six temperature sensors 100 are disposed along line L5. The six temperature sensors 100 are spaced to be equal in pitch.

Note that, as shown in FIG. 19, lines L3 and L4 are spaced as follows: when temperature sensors 100a disposed on line L3 subjected to a magnetic field strength of the largest value (P1) are spaced by a distance P12, temperature sensor 100a disposed on line L3 and a temperature sensor 100b disposed on line L4 and most adjacent to temperature sensor 100a on line L3 are spaced by a distance P13 larger than distance P12 (i.e., P12<P13). Note that when temperature sensors 100b disposed on line L4 are spaced by a distance P14, distance P14 is provided to be larger than distance P13 (i.e., P13<P14).

Furthermore, as shown in FIG. 19, lines L4 and L5 are spaced as follows: when temperature sensors 100b disposed on line L4 are spaced by distance P14, temperature sensor 100b on line L4 and a temperature sensor 100c disposed on line L5 and most adjacent to temperature sensor 100b on line L4 are spaced by a distance P15 larger than distance P14 (i.e., P14<P15). Furthermore, when temperature sensors 100c disposed on line L5 are spaced by a distance P16, distance P16 is provided to be larger than distance P15 (i.e., P15<P16).

Thus in the present embodiment temperature sensors 100 are spaced closer together at the location of a strong portion of an electromagnetic field strength generated from power transmitting unit 56 than the location of a weak portion of the electromagnetic field strength generated from power transmitting unit 56. Thus, temperature sensor 100 is disposed on the primary side's lid member 64 at internal surface 64r facing primarily coil unit 60, in such a manner that a region experiencing a largest magnetic field strength generated from primarily coil unit 60 (i.e., on line L3) is subject to a densest temperature sensing range and a region farther away from the region experiencing the largest magnetic field strength generated from primarily coil unit 60 is subject to a sparser temperature sensing range.

Note that in the present embodiment there are two regions experiencing the largest magnetic field strength generated from primarily coil unit 60 (i.e., two lines L3), and accordingly, for example in FIG. 17 when seen downward from line L3 located upward temperature sensor 100 is once disposed to provide a sparser temperature sensing range, and once line L1 is passed, temperature sensor 100 is disposed to again provide a dense temperature sensing range.

As a result, a region experiencing a larger magnetic field strength can be subject to a denser sensing range of temperature sensor 100 allowing a small foreign matter (a button cell (metal+electrolyte), and a lighter (metal+combustibles)) to be also sensed with good precision. As a result, a region experiencing a large magnetic field strength and prone to heat a foreign matter present therein to high temperature can have the foreign matter that is heated to high temperature sensed with good precision.

In contrast, a region experiencing a small magnetic field strength, which is less prone to heat a foreign matter present therein to high temperature, has temperature sensors 100 spaced farther apart and is thus subject to a sparser sensing range of temperature sensor 100. This can reduce a cost increasing in disposing the temperature sensors.

Note that while FIG. 17 shows temperature sensors 100 spaced such that, as seen in a direction farther away from the region experiencing the largest magnetic field strength generated from primarily coil unit 60, temperature sensors 100b are spaced farther apart in both a direction L-R and a direction F-B, it is believed that while the magnetic field strength generated from primarily coil unit 60 varies in direction F-B, as shown in FIG. 10, it has small variation in direction L-R.

Figure 20:
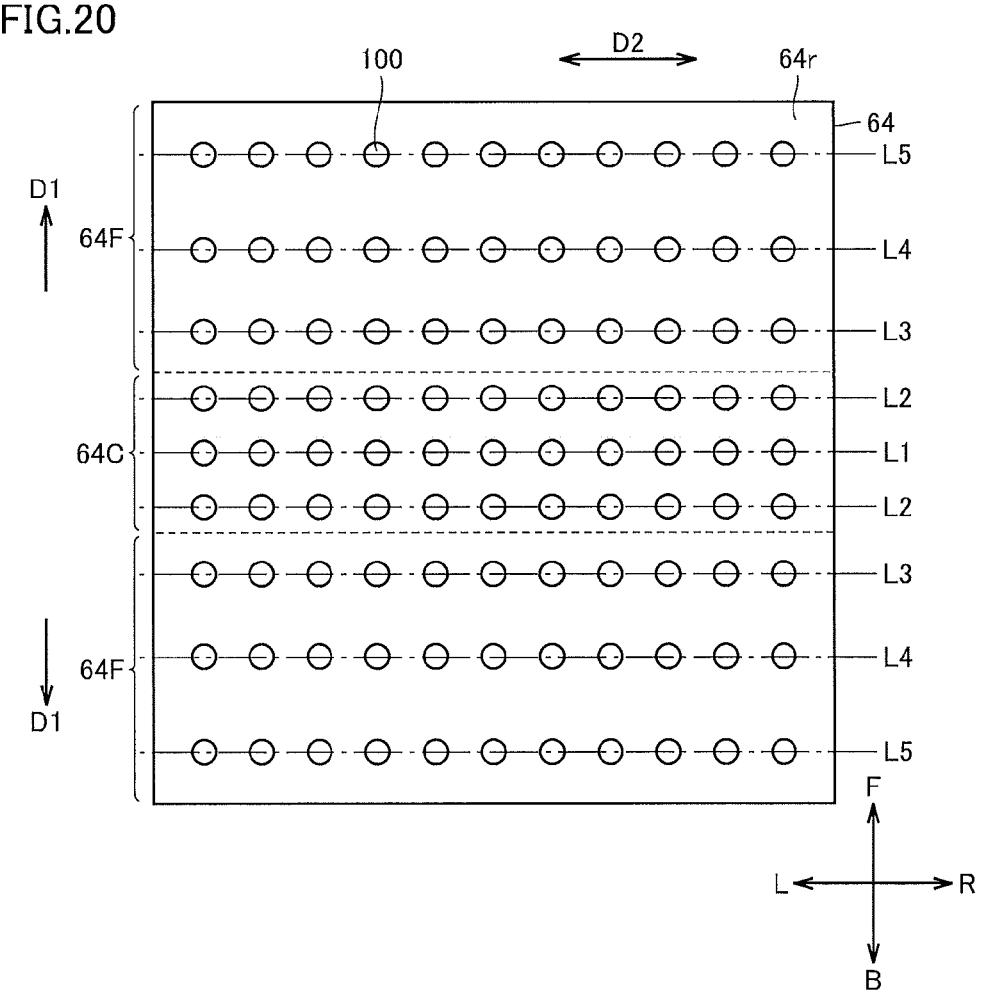
FIG. 20 is a plan view of another lid member provided with the temperature sensor provided for the power transmitting device, that is disposed in a different manner in an embodiment.

Accordingly, as shown in FIG. 20, temperature sensors 100 may be spaced invariably in direction L-R (or in a direction D2 in the figure), and spaced farther apart only in direction F-B (or in a direction D1 in the figure) as seen in the direction farther away from the region experiencing the largest magnetic field strength generated from primarily coil unit 60.

Figure 21:
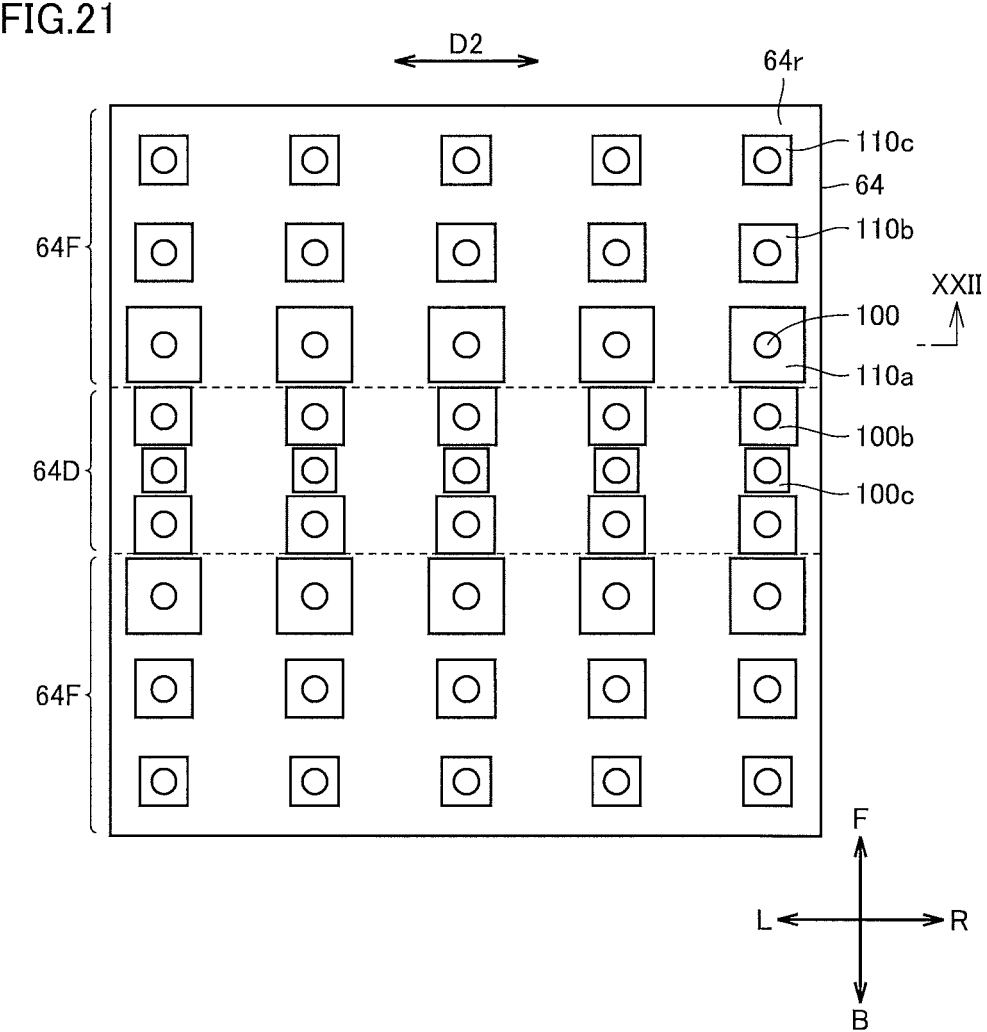
FIG. 21 is a plan view of still another lid member provided with the temperature sensor provided for the power transmitting device, that is disposed in another different manner in an embodiment.
Figure 22:
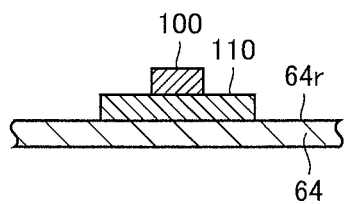
FIG. 22 is a cross section taken along an arrow-headed line XXII-XXII indicated in FIG. 21, and seen in a direction indicated by the line.

Furthermore, as shown in FIG. 21, it is recommendable that temperature sensors 100 be spaced invariably, and, for temperature sensor 100 located in the region experiencing the largest magnetic field strength generated from primarily coil unit 60, the primary side's lid member 64 at internal surface 64r facing primarily coil unit 60 be provided with a first conductive plate 110a largest in area and excellently thermally conductive, and temperature sensor 100 be disposed on first conductive plate 110a to provide an enlarged sensing range. Accordingly, the FIG. 21 configuration includes a configuration that includes a conductive plate to configure a temperature sensor. As a result, temperature sensors (or conductive plates) are spaced closer together at the location of a strong portion of an electromagnetic field strength generated from power transmitting unit 56 than the location of a weak portion of the electromagnetic field strength generated from power transmitting unit 56.

Temperature sensor 100 located at a region farther away from the region experiencing the largest magnetic field strength generated from primarily coil unit 60 may be provided with a second conductive plate 110b having a smaller area than first conductive plate 110a, and temperature sensor 100 located at a region still farther away from the region experiencing the largest magnetic field strength generated from primarily coil unit 60 may be provided with a third conductive plate 110c having a smaller area than second conductive plate 110b. Note that the conductive plates may be equal in area and varied in thermal conductivity to obtain an effect similar to that of the FIG. 21 configuration.

Furthermore, while the FIG. 21 configuration has been described with temperature sensors 100 all identical in performance, sensors having different temperature sensing ranges may be combined so that a sensor having a large temperature sensing range may be used for a region experiencing large magnetic field strength and a sensor having a small temperature sensing range may be used for a region experiencing small magnetic field strength.

This configuration will also dispose temperature sensor 100 on the primary side's lid member 64 at internal surface 64r facing primarily coil unit 60 such that a region experiencing large magnetic field strength generated from primarily coil unit 60 is subject to a dense temperature sensing range and a region farther away from the region experiencing the large magnetic field strength generated from primarily coil unit 60 is subject to a sparser temperature sensing range.

As a result, a region experiencing a larger magnetic field strength can be subject to a denser sensing range of temperature sensor 100 allowing a small foreign matter (a button cell (metal+electrolyte), and a lighter (metal+combustibles)) to be also sensed with good precision. As a result, a region experiencing a large magnetic field strength and prone to heat a foreign matter present therein to high temperature can have the foreign matter that is heated to high temperature sensed with good precision.

In contrast, a region experiencing a small magnetic field strength, which is less prone to heat a foreign matter present therein to high temperature, has temperature sensors 100 spaced farther apart and is thus subject to a sparser sensing range of temperature sensor 100. This can reduce a cost increasing in disposing the temperature sensors.

Figure 23:
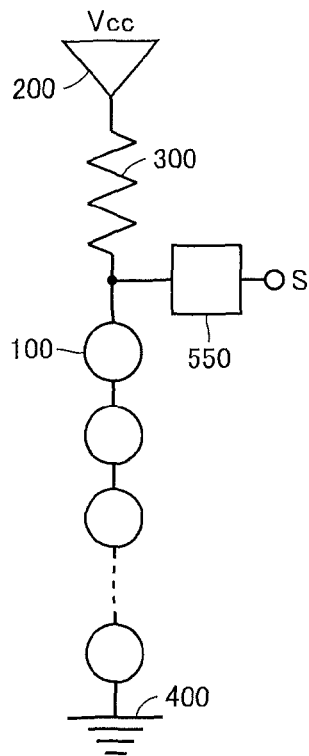
FIG. 23 shows a temperature sensing circuit of the temperature sensor.
Figure 24:
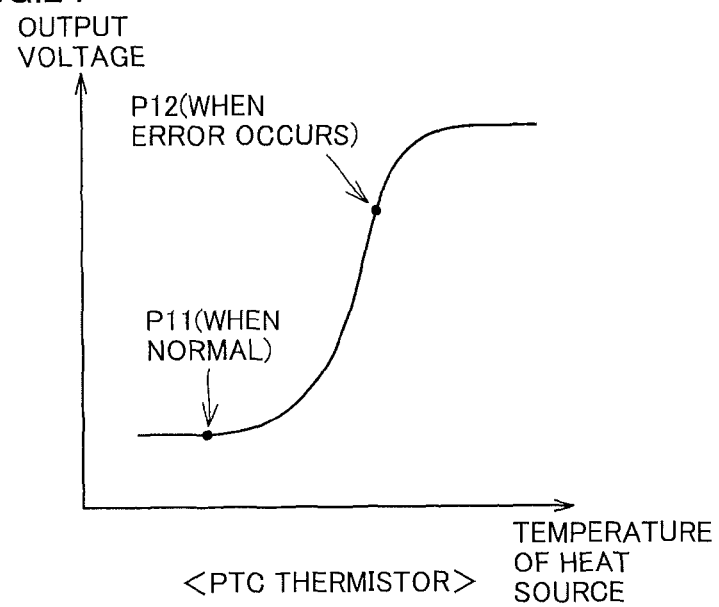
FIG. 24 represents a voltage-temperature characteristic of a PTC thermistor.
Figure 25:
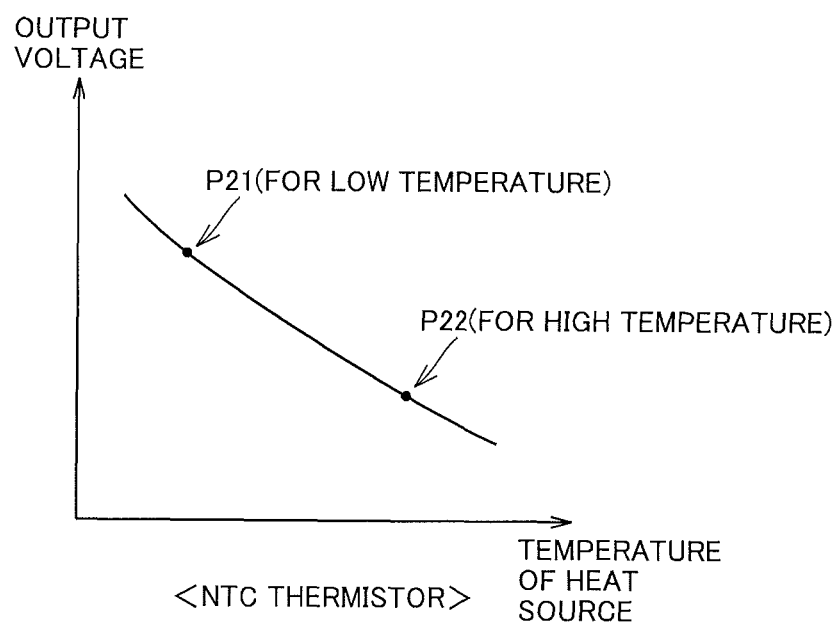
FIG. 25 represents a voltage-temperature characteristic of an NTC thermistor.
Figure 26:
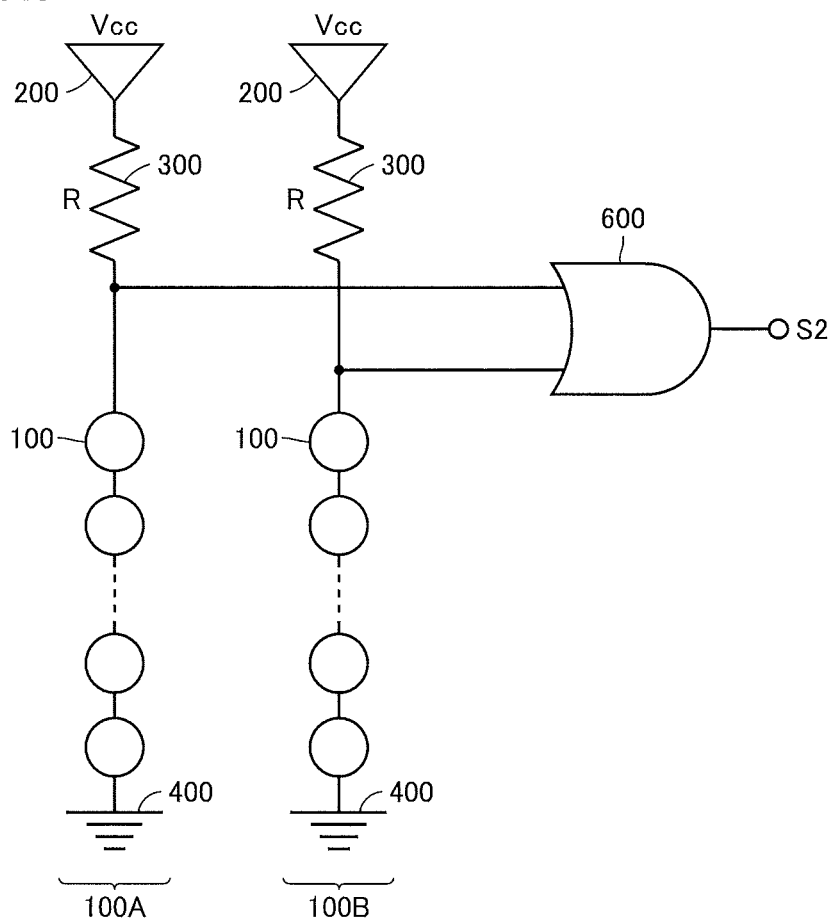
FIG. 26 shows another temperature sensing circuit of the temperature sensor.

Reference will now be made to FIG. 23 to FIG. 26 to describe how temperature sensor 100 is connected. FIG. 23 shows a temperature sensing circuit of temperature sensor 100, FIG. 24 represents a voltage-temperature characteristic of a PTC thermistor, FIG. 25 represents a voltage-temperature characteristic of an NTC thermistor, and FIG. 26 shows another temperature sensing circuit of the temperature sensor.

With reference to FIG. 23, in the present embodiment, a resistor 300 and a plurality of temperature sensors 100 are connected in series. It is recommendable to implement temperature sensor 100 by a positive temperature coefficient (PTC) thermistor. The PTC thermistor has a nature allowing a value in resistance to rapidly increase as temperature rises. As a result, as shown in FIG. 24, when the PTC thermistor is used for the temperature sensing circuit of FIG. 23, it normally outputs a voltage P11, whereas it outputs a rapidly increasing voltage P12 when an error arises as the PTC thermistor rises in temperature. This can facilitate sensing a heated condition.

In contrast, a negative temperature coefficient (NTC) thermistor has a nature allowing a value in resistance to rapidly decrease as temperature rises. The NTC thermistor has a nature allowing the value in resistance to constantly decrease as temperature rises. As a result, as shown in FIG. 25, when the NTC thermistor is used for the temperature sensing circuit of FIG. 23, it normally outputs a voltage P21, whereas it outputs a voltage P22 lower than voltage P21 when an error arises as the NTC thermistor rises in temperature. When the NTC thermistor is used, it outputs a voltage decreasing substantially in inverse proportion as temperature rise, and accordingly, the PTC thermistor is preferably used in terms of observing a heated condition.

Furthermore, NTC thermistors must be connected in parallel to measure temperature. This requires each NTC thermistor to have a reference resistance and an output terminal for temperature measurement, which will invite an increased number of elements, a complicated wiring, and hence an increased cost, whereas the PTC thermistor does not invite such an increased cost.

An output signal that is obtained as described above is transmitted to a monitoring circuit 550. Monitoring circuit 550 includes a memory unit having stored therein data of a temperature distribution presented when temperature sensor 100 senses abnormally high temperature, and monitoring circuit 550 uses this stored temperature distribution data to determine from a signal obtained from the temperature sensing circuit whether there is a foreign matter heated to high temperature between power receiving unit 20 and power transmitting unit 56.

If monitoring circuit 550 determines that there is a foreign matter heated to high temperature, a predetermined output signal S1 is output to control unit 55 (see FIG. 1), to stop power transmitting device 50 from transmitting electric power. Furthermore, a power transmission stop signal may be transmitted from antenna 61 that is associated with power transmitting device 50 to antenna 49 that is associated with electrically driven vehicle 10 and the signal may thus be transmitted to electrically driven vehicle 10. Note that monitoring circuit 550 may be provided in control unit 55.

Furthermore, as shown in FIG. 26, when a plurality of temperature sensors 100 are disposed on the primary side's lid member 64 at internal surface 64r facing primarily coil unit 60, the plurality of temperature sensors 100 are divided into a first temperature sensor group 100A having a plurality of temperature sensors 100 and a second temperature sensor group 100B having a plurality of temperature sensors 100, and first temperature sensor group 100A and second temperature sensor group 100B are provided in parallel and adapted to output an output signal to a logic circuit (OR) circuit (a sensor circuit) 600.

When logic circuit (OR) circuit (sensor circuit) 600 receives a signal from at least one of the sensor groups, logic circuit (OR) circuit (sensor circuit) 600 uses data previously stored and indicative of a temperature distribution that is presented when temperature sensor 100 senses abnormally high temperature, to determine from the signal obtained from the at least one of the sensor groups whether there is a foreign matter heated to high temperature between power receiving unit 20 and power transmitting unit 56.

If logic circuit (or sensor circuit) 600 determines that there is a foreign matter heated to high temperature, a predetermined output signal S2 is output to control unit 55, and transmitting electric power by power transmitting device 50 is stopped. Furthermore, a power transmission stop signal may be transmitted from power transmitting device 50's antenna 61 to electrically driven vehicle 10's antenna 49 and the signal may thus be transmitted to electrically driven vehicle 10. Note that logic circuit (or sensor circuit) 600 may be provided in control unit 55.

Note that in the above description, a plurality of temperature sensors 100 are mainly provided on the primary side's lid member 64 at internal surface 64r facing primarily coil unit 60.

Figure 27:
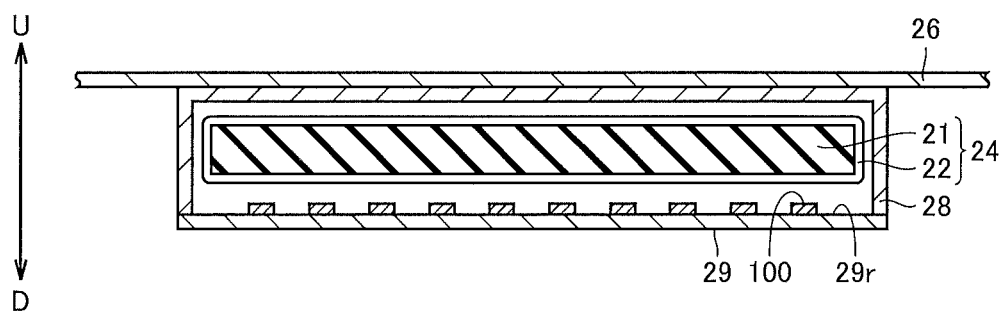
FIG. 27 is a cross section of a power receiving unit with a lid member provided with a temperature sensor in an embodiment.

However, as shown in FIG. 27, a plurality of temperature sensors 100 may also be provided on the secondary side's lid member 29, rather than the primary side's lid member 64, at an internal surface 29r facing secondary coil unit 24 in the manner described above, and the temperature sensing circuit may also be applied thereto, as has been described above.

When temperature sensor 100 is disposed on the secondary side's lid member 29, the signal obtained from the temperature sensing circuit should be output to vehicular ECU 12 to stop power receiving device 11 from receiving electric power. Furthermore, a power reception stop signal may be transmitted from electrically driven vehicle 10's antenna 49 to power transmitting device 50's antenna 61 and the signal may thus be transmitted to external power feeding apparatus 51.

Note that, to sense temperature with higher precision, temperature sensor 100 may be provided to both the primary side's lid member 64 and the secondary side's lid member 29. Furthermore, temperature sensors may not only be divided into the two groups of first temperature sensor group 100A and second temperature sensor group 100B, but instead be divided into three or more sensor groups.

Drive Mechanism 30 of Power Receiving Unit 20

Figure 28:
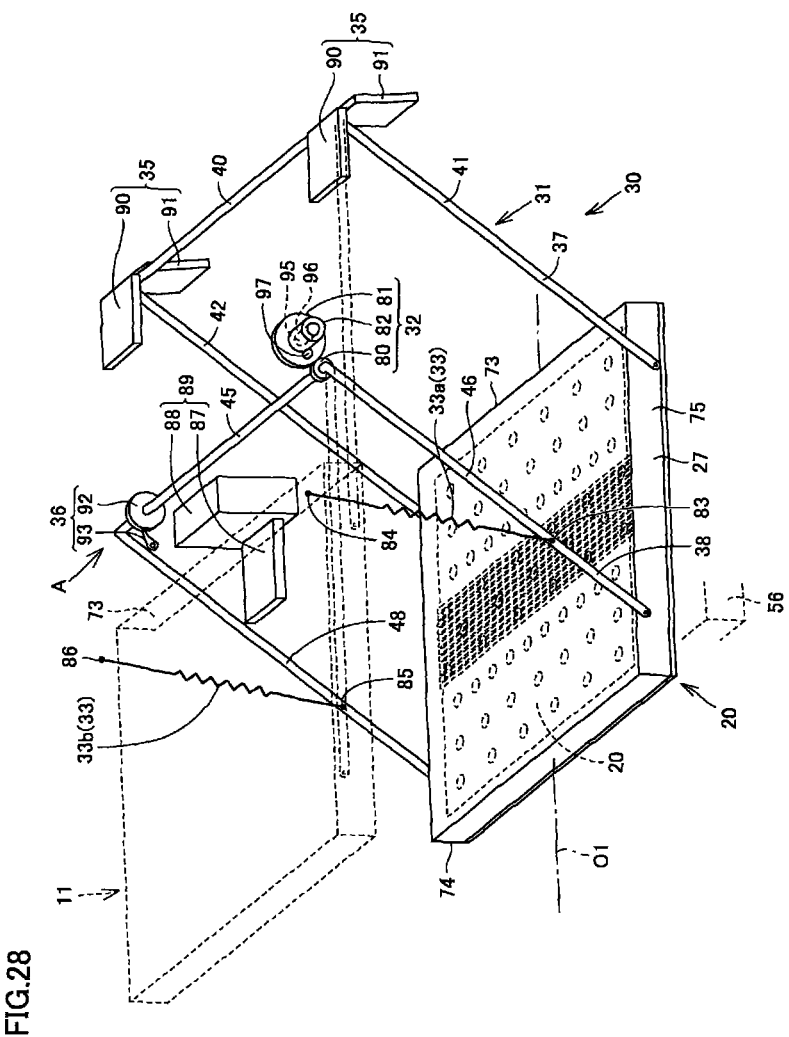
FIG. 28 is a perspective view of a movable mechanism that can be provided at the power receiving unit in an embodiment.
Figure 29:
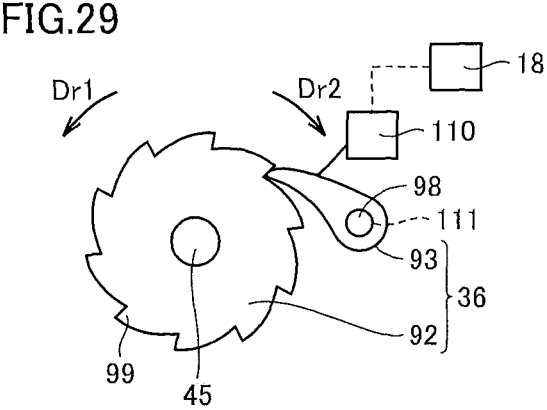
FIG. 29 is a view as seen in a direction of an arrow A shown in FIG. 28.
Figure 30:
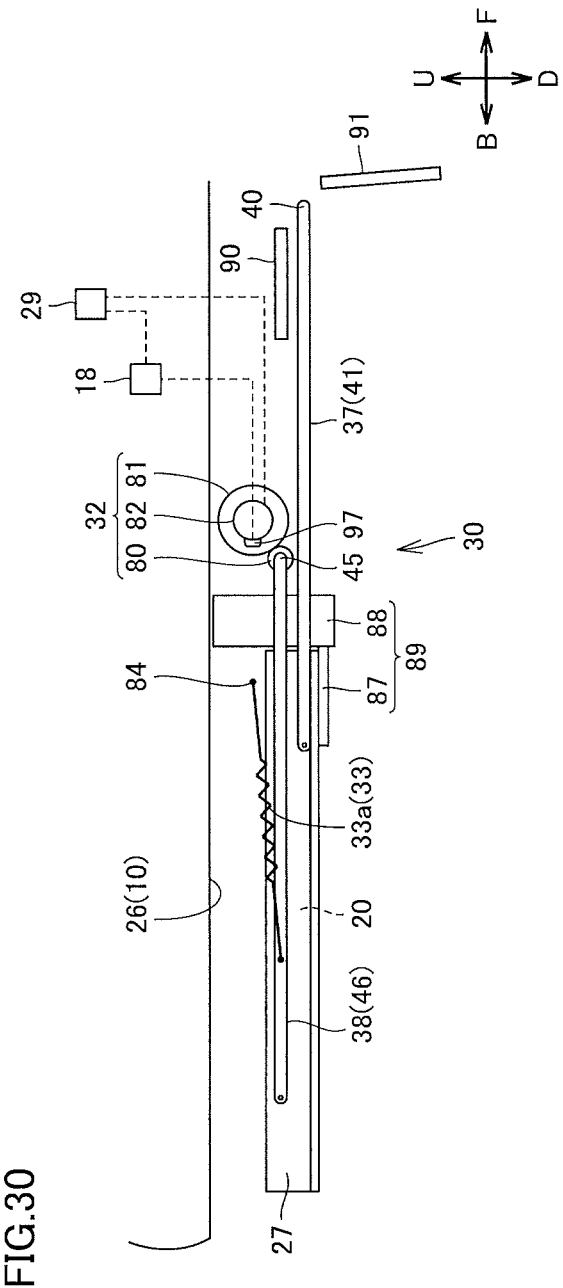
FIG. 30 is a perspective view of the movable mechanism that can be provided at the power receiving unit in an embodiment, that has ascended.
Figure 31:
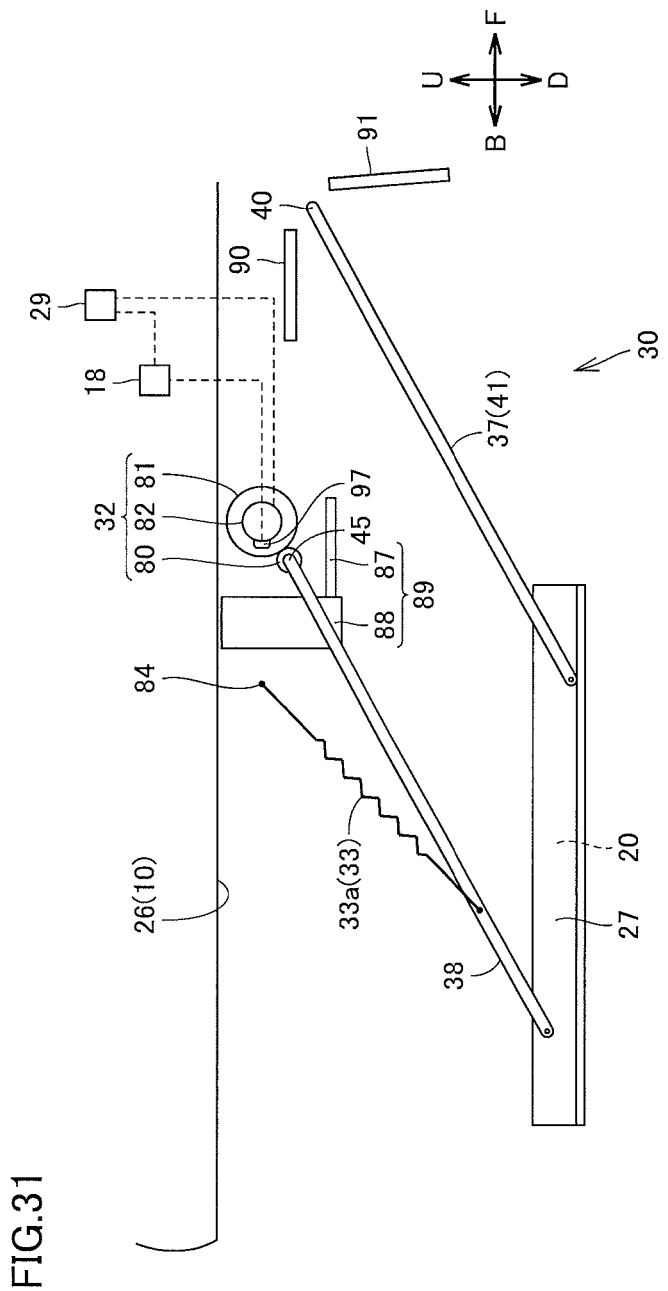
FIG. 31 is a perspective view of the movable mechanism that can be provided at the power receiving unit in an embodiment, that assumes an intermediate position.
Figure 32:
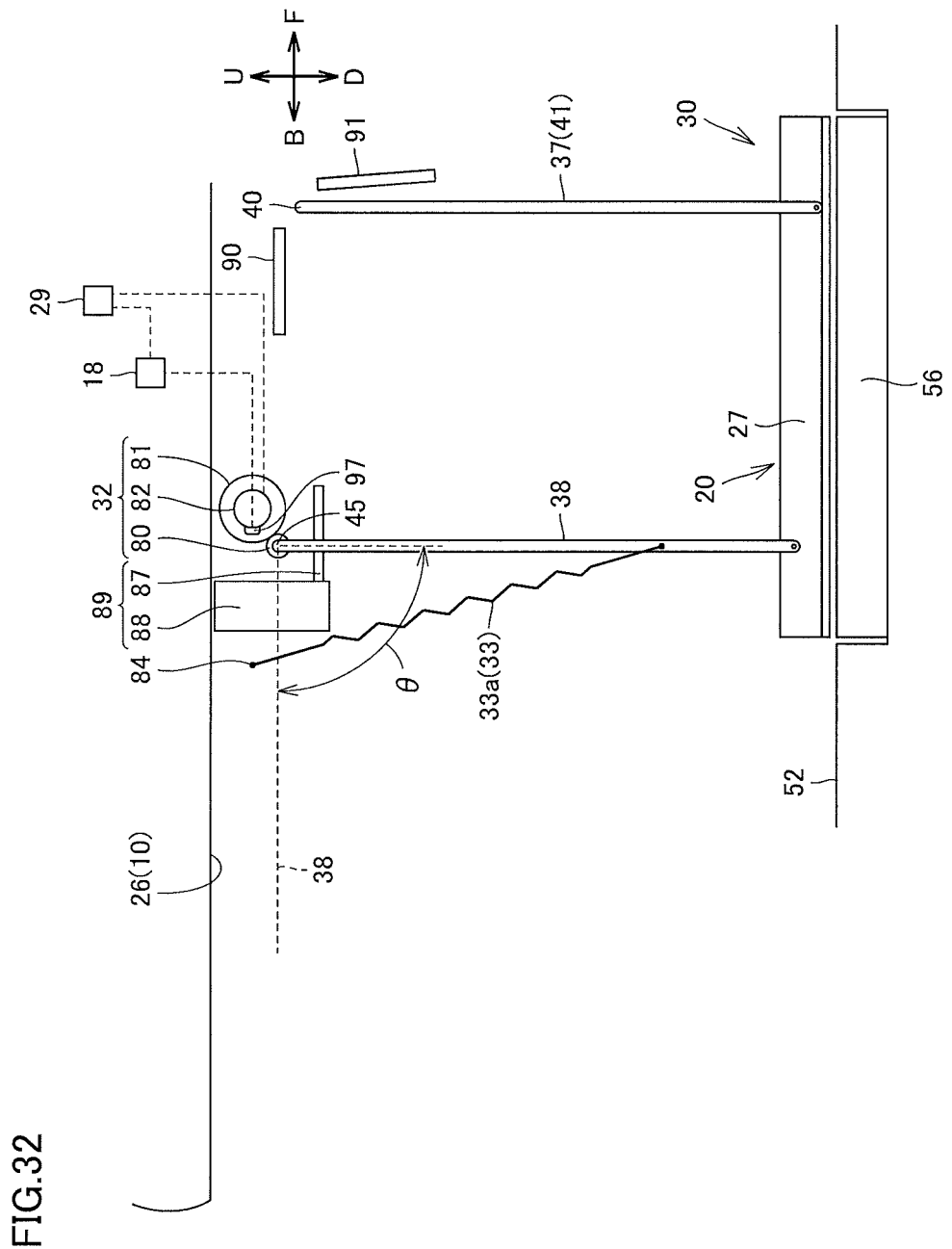
FIG. 32 is a perspective view of the movable mechanism that can be provided at the power receiving unit in an embodiment, that has descended.

Reference will now be made to FIG. 28 to FIG. 32 to describe drive mechanism 30 that supports power receiving unit 20 to be capable of ascending and descending when temperature sensor 100 is disposed on the secondary side's lid member 29, FIG. 28 is a perspective view of drive mechanism 30 that can be provided at power receiving unit 20 in an embodiment, FIG. 29 is a view as seen in a direction of an arrow A shown in FIG. 28, FIG. 30 is a perspective view of drive mechanism 30 that can be provided at power receiving unit 20 in an embodiment, that has ascended, FIG. 31 is a perspective view of drive mechanism 30 that can be provided at power receiving unit 20 in an embodiment, that assumes an intermediate position, and FIG. 32 is a perspective view of drive mechanism 30 that can be provided at power receiving unit 20 in an embodiment, that has descended.

As shown in FIG. 28, power receiving unit 20 is provided with drive mechanism 30 capable of moving power receiving unit 20 toward power transmitting unit 56 to be adjacent thereto and moving power receiving unit 20 away from power transmitting unit 56.

Drive mechanism 30 includes a link mechanism 31, a drive unit 32, a biasing member 33, a holding device 89, a stopper 35, and a switching unit 36. Link mechanism 31 includes a support member 37 and a support member 38.

Support member 37 includes a rotary shaft 40 rotatably supported by floor panel 26 or the like, a leg 41 formed at one end of rotary shaft 40, and a leg 42 connected to the other end of rotary shaft 40. Leg 41 has a lower end rotatably connected to the secondary side's casing 27 at a side wall 75. Leg 42 has a lower end rotatably connected to the secondary side's casing 27 at a side wall 74.

Support member 38 is spaced from support member 37 as seen along winding axis O1. Support member 38 includes a rotary shaft 45 rotatably supported by floor panel 26 or the like, a leg 46 connected to one end of rotary shaft 45, and a leg 48 connected to the other end of rotary shaft 45. Leg 46 has a lower end rotatably connected to side wall 75 and leg 48 has a lower end rotatably connected to side wall 74.

Drive unit 32 includes a gear 80 provided at an end portion of rotary shaft 45, a gear 81 meshing with gear 80, and a motor 82 rotating gear 81.

Motor 82 includes a rotor 95 provided rotatably and connected to gear 81, a stator 96 surrounding rotor 95, and an encoder 97 sensing rotor 95 in angle of rotation.

When motor 82 receives electric power, rotor 95 rotates. As rotor 95 rotates, gear 81 accordingly rotates, and gear 80 meshing with gear 81 also rotates. As gear 80 is fixed to rotary shaft 45, rotary shaft 45 will rotate. As rotary shaft 45 rotates, power receiving unit 20 and the secondary side's casing 27 move. Motor 82 thus provides a driving force which is in turn transmitted to power receiving unit 20 and the secondary side's casing 27. Power receiving unit 20 and the secondary side's casing 27 ascend or descend, as controlled depending on in which direction motor 82 rotates.

Biasing member 33 includes a resilient member 33a connected to leg 46 and floor panel 26, and a resilient member 33b connected to leg 48 and floor panel 26.

Note that resilient member 33a has an end 83 rotatably connected to leg 46 and resilient member 33a has an end 84 rotatably connected to floor panel 26. Resilient member 33b also has an end 85 rotatably connected to leg 48 and an end 86 rotatably connected to floor panel 26.

Resilient member 33a has end 83 at a side of leg 46 closer to the lower end thereof than the center thereof. Resilient member 33a has end 84 opposite to support member 37 with leg 46 and rotary shaft 45 having their connection between end 84 and support member 37.

Resilient member 33b has end 85 at a side of leg 48 closer to the lower end thereof than the center thereof. Resilient member 33b has end 86 opposite to support member 37 with rotary shaft 45 and leg 48 having their connection between end 86 and support member 37.

FIG. 28 also shows power receiving unit 20 (by a dashed line) and the secondary side's casing 27 before power receiving unit 20 descends toward power transmitting unit 56, i.e., in an initial state. In the initial state, resilient member 33a and resilient member 33b have their lengths in a natural state.

Then, as shown in FIGS. 31 and 32, when power receiving unit 20 and the secondary side's casing 27 are displaced downward, resilient member 33a and resilient member 33b extend. This tensions resilient member 33a and resilient member 33b. This tension biases power receiving unit 20 and the secondary side's casing 27 to the initial state.

Holding device 89 includes a body 88 thereof fixed to floor panel 26 or the like, and a support member 87 adjusted in by how much amount it projects from body 88. Support member 87 supports the secondary side's casing 27 in the initial state on a bottom surface thereof (or the secondary side's lid member) and fixes power receiving unit 20 to electrically driven vehicle 10, Note that end wall 73 may be provided with a hole to receive support member 87 therein.

Stopper 35 includes a stopper piece 90 and a stopper piece 91 to restrain leg 41 in angle of rotation to define a range allowing power receiving unit 20 and side wall 75 to rotate.

Stopper piece 90 comes into contact with legs 41, 42 to prevent power receiving unit 20 and the secondary side's casing 27 from coming into contact with the electrically driven vehicle 10 floor panel 26 and the like.

Stopper piece 91 serves to abut against legs 41, 42 to allow power receiving unit 20 and the secondary side's casing 27 to move downward within a limited range to thus prevent them from coming into contact with a member placed on the ground surface.

Switching unit 36 includes a gear 92 fixed to rotary shaft 45, and a stopper 93 engaging with gear 92. Note that stopper 93 is engaged/disengaged with/from gear 92, as controlled by vehicular ECU 12 shown in FIG. 1. When stopper 93 engages with gear 92, rotary shaft 45 is restrained from rotating in a direction allowing power receiving unit 20 to descend, i.e., in a restraint state. Specifically, the restraint state is a state permitting power receiving unit 20 to move away from power transmitting unit 56 and also preventing power receiving unit 20 from approaching power transmitting unit 56.

Note that when stopper 93 is disengaged from gear 92, switching unit 36 is placed in a permissive state, which permits rotary shaft 45 to rotate in a direction allowing power receiving unit 20 to ascend and permits rotary shaft 45 to rotate so that power receiving unit 20 descends. Specifically, the permissive state is a state permitting power receiving unit 20 to move away from power transmitting unit 56 and also permitting power receiving unit 20 to approach power transmitting unit 56.

FIG. 29 is a schematic side view of switching unit 36 as seen in a direction indicated in FIG. 28 by an arrow A. As shown in FIG. 29, switching unit 36 includes gear 92 fixed to rotary shaft 45, stopper 93 selectively engaging with gear 92, and a drive unit 110.

Gear 92 has a circumferential surface provided with a plurality of mutually spaced teeth 99. Stopper 93 is rotatably provided on an axial shaft 98. Drive unit 110 rotates stopper 93. Drive unit 110 switches a state allowing stopper 93 to have a tip engaged with tooth 99 to a state allowing stopper 93 to have the tip separated from gear 92 to disengage stopper 93 from gear 92, and vice versa.

Note that axial shaft 98 is provided with a torsion spring 111 or the like and stopper 93 is biased by a force applied by torsion spring 111 so that stopper 93 has its tip pressed against a circumferential surface of gear 92.

Drive unit 110 can rotate stopper 93 to allow stopper 93 to have its tip moved away from the circumferential surface of gear 92 against the force applied by torsion spring 111 to bias the stopper. Note that drive unit 110 is driven as controlled by movable mechanism control unit 18.

A direction of rotation Dr1 is a direction in which rotary shaft 45 and gear 92 rotate when power receiving unit 20 and the secondary side's casing 27 ascend, and a direction of rotation Dr2 is a direction in which rotary shaft 45 and gear 92 rotate when power receiving unit 20 and the secondary side's casing 27 descend.

When stopper 93 engages with gear 92, gear 92 is restrained from rotating in direction of rotation Dr2.

With stopper 93 engaged with gear 92, gear 92 can still rotate in direction of rotation Dr1.

With reference to FIG. 1, adjustment unit 9 adjusts an amount of electric power supplied from battery 15 to motor 82 of drive mechanism 30. Movable mechanism control unit 18 controls adjustment unit 9 drivably.

Hereinafter will be described how power receiving unit 20 configured as described above operates when it receives electric power from power transmitting unit 56.

When power receiving unit 20 receives electric power from power transmitting unit 56, electrically driven vehicle 10 is stopped (or parked) at a prescribed position. FIG. 30 is a side view of power receiving unit 20, the secondary side's casing 27, and drive mechanism 30 shown when electrically driven vehicle 10 is stopped.

As shown in FIG. 30, the secondary side's casing 27 is supported by holding device 89 to be adjacent to floor panel 26, and the secondary side's casing 27 is fixed in the initial position. Note that in the initial state, biasing member 33 has a natural length, and biasing member 33 is in a state that does not apply force such as tension to power receiving unit 20 and the secondary side's casing 27.

Then, when power receiving unit 20 receives electric power contactlessly, movable mechanism control unit 18 drives holding device 89 to retract support member 87 from a lower surface of the secondary side's casing 27.

Then, movable mechanism control unit 18 turns on adjustment unit 9 to allow battery 15 to supply motor 82 with electric power.

Once motor 82 has received electric power, motor 82 provides motive force, and as shown in FIG. 31, leg 46 rotates about rotary shaft 45. This allows power receiving unit 20 and the secondary side's casing 27 to move in vertically downward direction D as well as vehicular frontward direction F.

At the time, support member 37 also moves to follow support member 38, power receiving unit 20, and the secondary side's casing 27. Note that support member 37 rotates about rotary shaft 40.

As power receiving unit 20 and the secondary side's casing 27 move, biasing member 33 extends, and biasing member 33 applies tension to the secondary side's casing 27 to attain the initial state, as shown in FIG. 30. Motor 82 resists the tension and moves the secondary side's casing 27. Encoder 97 transmits an angle of rotation of rotor 95 of motor 82 to movable mechanism control unit 18.

FIG. 32 is a side view showing a state presented when power receiving unit 20 receives electric power from power transmitting unit 56 contactlessly.

With reference to FIG. 32, movable mechanism control unit 18 understands where the secondary side's casing 27 and power receiving unit 20 are located, based on information received from encoder 97. Then, when movable mechanism control unit 18 determines that rotor 95 has an angle of rotation allowing power receiving unit 20 and power transmitting unit 56 to face each other, then, with reference to FIG. 29, movable mechanism control unit 18 drives drive unit 110 to engage stopper 93 with gear 92.

This stops gear 92 and rotary shaft 45 from rotating and hence stops power receiving unit 20 and the secondary side's casing 27 from descending. Note that biasing member 33 provides tension smaller than the driving force provided from motor 82, and power receiving unit 20 and the secondary side's casing 27 are thus restrained from ascending. Thus, power receiving unit 20 and the secondary side's casing 27 are stopped from moving. In other words, while motor 82 drives power receiving unit 20 and the secondary side's casing 27 in a direction to allow them to descend, stopper 93 engages with gear 92 to stop power receiving unit 20 and the secondary side's casing 27 from moving, and, as the driving force of motor 82 is larger than the tension of biasing member 33, power receiving unit 20 and the secondary side's casing 27 are held stopped.

In FIG. 32, a dashed line indicates support member 38 at a position in an initial state. With this initial state serving as a reference, support member 38 rotates by an angle of rotation θ.

In the present embodiment, power receiving unit 20 is aligned with power transmitting unit 56 with angle of rotation θ falling within a range larger than or equal to 45 degrees and smaller than or equal to 100 degrees.

When angle of rotation θ in this range is changed in a given amount, power receiving unit 20 displaces in a larger amount in vehicular rearward and frontward directions B and F (i.e., horizontally) than in vertically upward and downward directions U and D.

If power receiving unit 20 is misaligned with power transmitting unit 56 in vehicular rearward or frontward direction B or F, power receiving unit 20 can be re-aligned with power transmitting unit 56 horizontally while power receiving unit 20 can be prevented from vertically, positionally varying significantly.

Preferably, power receiving unit 20 is aligned with power transmitting unit 56 with angle of rotation θ falling within a range larger than or equal to 45 degrees and smaller than or equal to 90 degrees.

Angle of rotation θ smaller than or equal to 90 degrees allows power receiving unit 20 to be aligned with power transmitting unit 56 with power receiving unit 20 moved within a reduced range and thus prevented from colliding against a foreign matter placed on the ground surface.

Note that in the FIG. 32 example, power receiving unit 20 faces power transmitting unit 56 at a position assumed when angle of rotation θ is substantially 90 degrees. In particular, when angle of rotation θ in a vicinity of 90 degrees varies in a given amount, power receiving unit 20 and the secondary side's casing 27 displace in a larger amount in vehicular rearward and frontward directions B and F (i.e., horizontally) than in vertically upward and downward directions U and D.

If power receiving unit 20 is misaligned with power transmitting unit 56 in vehicular rearward or frontward direction B or F, power receiving unit 20 can be re-aligned with power transmitting unit 56 horizontally while power receiving unit 20 can be prevented from vertically, positionally varying significantly.

Power Transmitting Unit 56 and Power Receiving Unit 20 in Other Form

In the above described embodiment, as shown in FIG. 4 and FIG. 6, the power transmitting unit 56 primarily coil unit 60 and the power receiving unit 20 secondary coil unit 24 are implemented as a solenoid type coil. However, they may be implemented as an annular coil, as will be described hereinafter.

Figure 33:
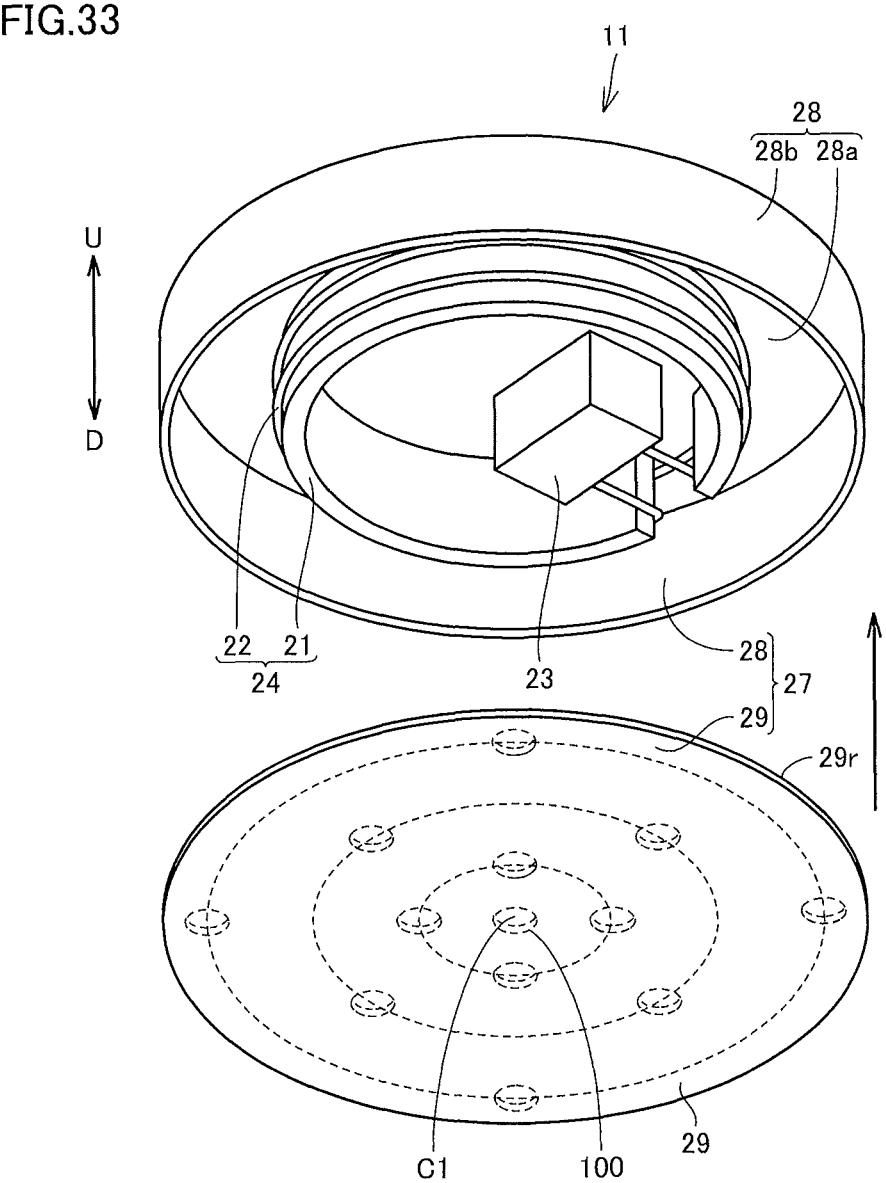
FIG. 33 shows a lid member provided with a temperature sensor provided for the power receiving device, as seen upward, when the coil is an annular coil.

FIG. 33 shows the power receiving unit 20 secondary coil unit 24 implemented as an annular coil. Power receiving unit 20 includes an annular secondary coil unit 24, and a secondary capacitor 23 connected to secondary coil unit 24. Secondary coil unit 24 includes a cylindrical core 21 and an annular secondary coil (or second coil) 22 wound on a circumferential surface of cylindrical core 21. This embodiment, as well as the FIG. 4 power receiving unit 20, does not include secondary capacitor 23 as an essential component. Secondary coil 22 is connected to rectifier 13 (see FIG. 1).

Furthermore, power receiving unit 20 is accommodated in the secondary side's casing 27. The secondary side's casing 27 includes a bottomed cylindrical shield 28 associated with the secondary side and having an opening, and a lid member 29 associated with the secondary side, and provided in the form of a flat disk and disposed to close the opening of the secondary side's shield 28. The secondary side's shield 28 includes a top 28a facing floor panel 26 (see FIG. 3), and an annular peripheral wall 28b extending from the top in vertically downward direction D. The secondary side's shield 28 is formed of a metallic material such as copper for example.

The secondary side's lid member 29 is provided in the form of a flat disk to close the opening of the secondary side's shield 28, and it is formed for example of resin material or the like.

When applying a temperature sensor to annular secondary coil unit 24 thus configured is considered secondary coil unit 24 provides magnetic field strength largest at a center region of annular secondary coil 22 and smaller radially outward. Accordingly, when temperature sensors 100 are disposed on the secondary side's lid member 29 at internal surface 29r facing secondary coil unit 24, a plurality of temperature sensors 100 are disposed such that temperature sensor 100 is disposed on the secondary side's lid member 29 in a region opposite to a center C1 thereof and temperature sensors 100 positioned radially outward are spaced farther apart.

This configuration will also dispose temperature sensor 100 on the secondary side's lid member 29 at internal surface 29r facing secondary coil unit 24 such that a region experiencing a largest magnetic field strength generated from secondary coil unit 24 is subject to a densest temperature sensing range and a region farther away from the region experiencing the largest magnetic field strength generated from secondary coil unit 24 is subject to a sparser temperature sensing range. As a result, a function and effect can be obtained that is similar to that provided when the solenoid type coil is used.

Figure 34:
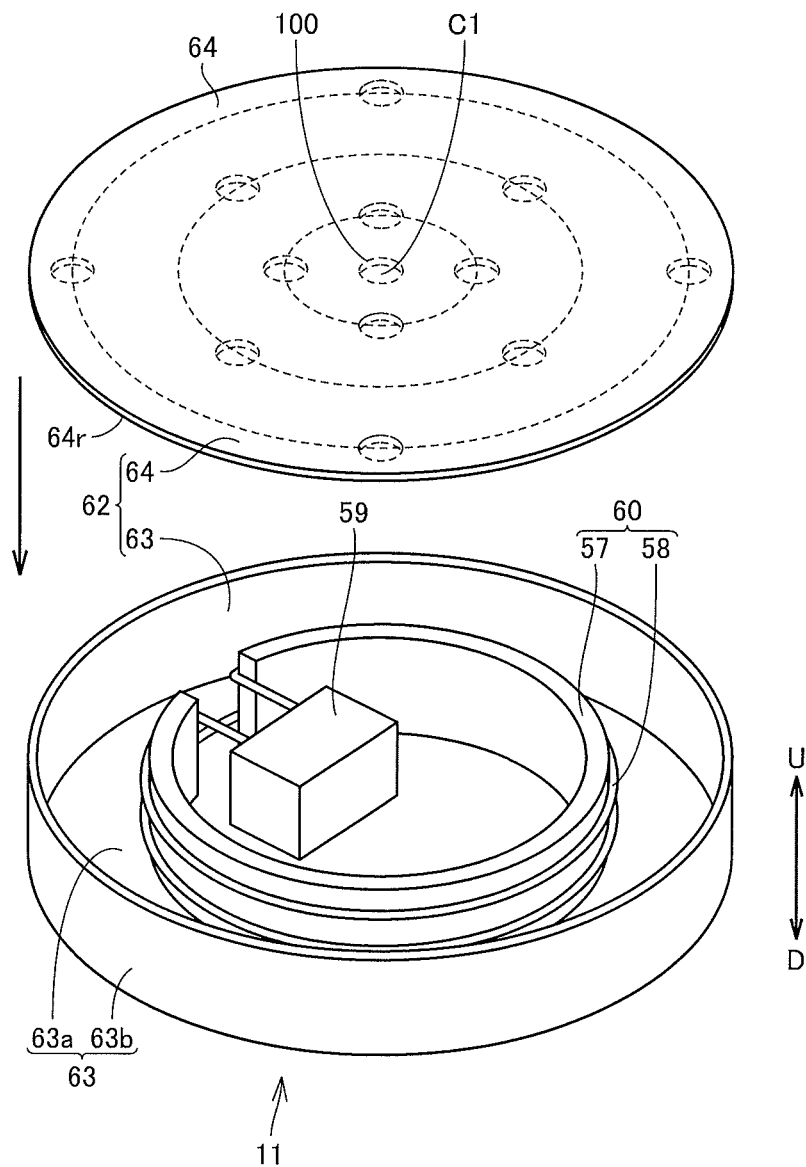
FIG. 34 shows a lid member provided with a temperature sensor provided for the power transmitting device, as seen downward, when the coil is an annular coil.

FIG. 34 shows the power transmitting unit 56 primarily coil unit 60 implemented as an annular coil. Power transmitting unit 56 includes an annular primarily coil unit 60 and a primary capacitor 59 connected to primarily coil unit 60. Primarily coil unit 60 includes a cylindrical core 57 and an annular primary coil (or first coil) 58 wound on cylindrical core 57. This embodiment, as well as the FIG. 6 power transmitting unit 56, does not include primary capacitor 59 as an essential component.

Furthermore, power transmitting unit 56 is accommodated in the primary side's casing 62. The primary side's casing 62 includes a bottomed cylindrical shield 63 associated with the primary side and having an opening, and a lid member 64 associated with the primary side, and provided in the form of a flat disk and disposed to close the opening of the primary side's shield 63. The primary side's shield 63 includes a top 63a located in parking space 52, and an annular peripheral wall 63b that is erect from top 63a in vertically upward direction U. The primary side's shield 63 is formed of a metallic material such as copper for example.

The primary side's lid member 64 is provided in the form of a flat disk to close the opening of the primary side's shield 63, and it is formed for example of resin material or the like.

When applying a temperature sensor to annular primarily coil unit 60 thus configured is considered, primary coil unit 60 provides magnetic field strength largest at a center of annular primary coil 58 and smaller radially outward. Accordingly, when temperature sensors 100 are disposed on the primary side's lid member 64 at internal surface 64r facing primarily coil unit 60, a plurality of temperature sensors 100 are disposed such that temperature sensor 100 is disposed on the primary side's lid member 64 at center C1 and temperature sensors 100 positioned radially outward are spaced farther apart.

This configuration will also dispose temperature sensor 100 on the primary side's lid member 64 at internal surface 64r facing primarily coil unit 60 such that a region experiencing a largest magnetic field strength generated from primarily coil unit 60 is subject to a densest temperature sensing range and a region farther away from the region experiencing the largest magnetic field strength generated from primarily coil unit 60 is subject to a sparser temperature sensing range. As a result, a function and effect can be obtained that is similar to that provided when the solenoid type coil is used.

Hereinafter reference will be made to FIGS. 2 and 35-38 to describe a principle by which power receiving unit 20 and power transmitting unit 56 transfer electric power therebetween.

The present embodiment provides a power transfer system including power transmitting unit 56 and power receiving unit 20 having natural frequencies, respectively, with a difference smaller than or equal to 10% of the natural frequency of power receiving unit 20 or power transmitting unit 56, as shown in FIG. 2. Power transmitting unit 56 and power receiving unit 20 each having a natural frequency set in such a range allow more efficient power transfer. Power transmitting unit 56 and power receiving unit 20 having natural frequencies, respectively, with a difference larger than 10% of the natural frequency of power receiving unit 20 or power transmitting unit 56 result in power transfer efficiency smaller than 10% and hence a detriment such as a longer period of time required to charge battery 15.

Herein, the natural frequency of power transmitting unit 56 when primary capacitor 59 is not provided means an oscillation frequency at which an electrical circuit formed of the inductance of primary coil 58 and the capacitance of primary coil 58 freely oscillates. When primary capacitor 59 is provided, the natural frequency of power transmitting unit 56 means an oscillation frequency at which an electrical circuit formed of the capacitance of primary coil 58 and primary capacitor 59 and the inductance of primary coil 58 freely oscillates. In the above electric circuit when braking force and electric resistance are zeroed or substantially zeroed the obtained natural frequency is also referred to as a resonance frequency of power transmitting unit 56.

Similarly, the natural frequency of power receiving unit 20 when secondary capacitor 23 is not provided means an oscillation frequency at which an electrical circuit formed of the inductance of secondary coil 22 and the capacitance of secondary coil 22 freely oscillates. When secondary capacitor 23 is provided, the natural frequency of power receiving unit 20 means an oscillation frequency at which an electrical circuit formed of the capacitance of secondary coil 22 and secondary capacitor 23 and the inductance of secondary coil 22 freely oscillates. In the above electric circuit when braking force and electric resistance are zeroed or substantially zeroed the obtained natural frequency is also referred to as a resonance frequency of power receiving unit 20.

Figure 35:
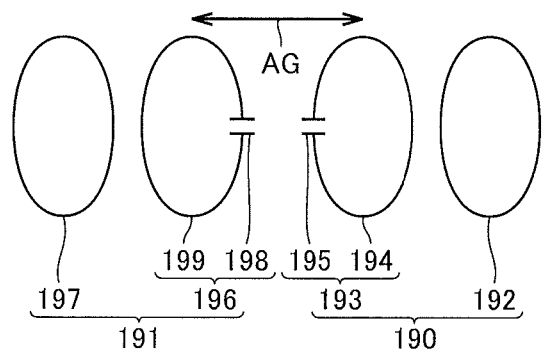
FIG. 35 shows a simulation model of the power transfer system.

Reference will now be made of FIGS. 35 and 36 to describe a result of a simulation done to analyze a relationship between a difference in natural frequency and power transfer efficiency. FIG. 35 shows a simulation model of a power transfer system. The power transfer system includes a power transmitting device 190 and a power receiving device 191, and power transmitting device 190 includes a coil 192 (an electromagnetic induction coil) and a power transmitting unit 193. Power transmitting unit 193 includes a coil 194 (a primary coil) and a capacitor 195 provided in coil 194.

Power receiving device 191 includes a power receiving unit 196 and a coil 197 (an electromagnetic induction coil). Power receiving unit 196 includes a coil 199 (a secondary coil) and a capacitor 198 connected to coil 199.

Coil 194 has an inductance Lt and capacitor 195 has a capacitance C1. Coil 199 has an inductance Lr and capacitor 198 has a capacitance C2. When each parameter is thus set, power transmitting unit 193 and power receiving unit 196 have natural frequencies f1 and f2, respectively, expressed by the following expressions (1) and (2):

$$f1=1/\{2\pi(Lt \times C1)^{1/2}\} \quad (1),$$

and $$f2=1/\{2\pi(Lr \times C2)^{1/2}\} \quad (2).$$

Figure 36:
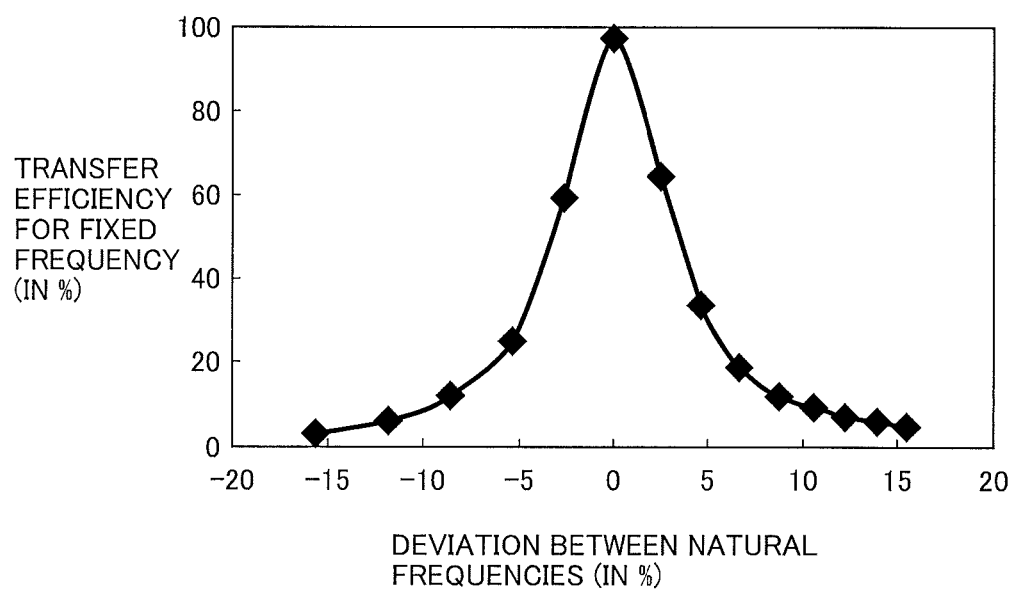
FIG. 36 is a graph showing a relationship between a difference in natural frequency of the power transmitting and receiving units and power transfer efficiency.

When inductance Lr and capacitances C1 and C2 are fixed and inductance Lt is alone varied, power transmitting unit 193 and power receiving unit 196 have natural frequencies with a deviation, which has a relationship with power transfer efficiency, as shown in FIG. 36. Note that in this simulation, coil 194 and coil 199 have a fixed relative, positional relationship, and furthermore, power transmitting unit 193 is supplied with a current fixed in frequency.

The FIG. 36 graph has an axis of abscissa representing a deviation between the natural frequencies (in %) and an axis of ordinate representing transfer efficiency (in %) for a fixed frequency. Deviation in natural frequency (in %) is represented by the following expression (3):

$$(\text{Deviation in natural frequency}) = \{(f1-f2)/f2\} \times 100 \, (\%) \quad (3).$$

As is also apparent from FIG. 36, when the natural frequencies have a deviation of ±0%, a power transfer efficiency close to 100% is achieved. When the natural frequencies have a deviation of ±5%, a power transfer efficiency of 40% is provided. When the natural frequencies have a deviation of ±10%, a power transfer efficiency of 10% is provided. When the natural frequencies have a deviation of ±15%, a power transfer efficiency of 5% is provided. In other words, it can be seen that the power transmitting and receiving units having their respective natural frequencies set with a deviation (in %) having an absolute value (or a difference) falling within a range of 10% or smaller of the natural frequency of power receiving unit 196, allow efficient power transfer. Furthermore, it can be seen that the power transmitting and receiving units having their respective natural frequencies set with a deviation (in %) in absolute value equal to or smaller than 5% of the natural frequency of power receiving unit 196, allow more efficient power transfer. The simulation has been done with an electromagnetic field analysis software (JMAG® produced by JSOL Corporation).

Hereinafter will be described how the power transfer system according to the present embodiment operates.

With reference to FIG. 1, primary coil 58 is supplied with ac power from high-frequency power driver 54. Primary coil 58 is supplied with the electric power to have an alternating current of a specific frequency passing therethrough.

When primary coil 58 has the current of the specific frequency passing therethrough, primary coil 58 forms an electromagnetic field surrounding primary coil 58 and oscillating at a specific frequency.

Secondary coil 22 is disposed within a prescribed range as measured from primary coil 58, and secondary coil 22 receives electric power from the electromagnetic field surrounding primary coil 58.

In the present embodiment, secondary coil 22 and primary coil 58 are so-called helical coils. Accordingly, primary coil 58 forms magnetic and electric fields surrounding primary coil 58 and oscillating at a specific frequency, and secondary coil 22 mainly receives electric power from that magnetic field.

Primary coil 58 forms the magnetic field of the specific frequency surrounding primary coil 58, as will more specifically be described hereinafter. "The magnetic field of the specific frequency" typically has an association with power transfer efficiency and a frequency of a current supplied to primary coil 58. Accordingly, what relationship exists between power transfer efficiency and the frequency of the current supplied to primary coil 58 will first be described. When electric power is transferred from primary coil 58 to secondary coil 22, it is transferred at an efficiency varying with a variety of factors such as a distance between primary coil 58 and secondary coil 22. For example, power transmitting unit 56 and power receiving unit 20 have a natural frequency (or resonant frequency) f0, primary coil 58 receives a current having a frequency f3, and secondary coil 22 and primary coil 58 have an air gap AG therebetween, for the sake of illustration.

Figure 37:
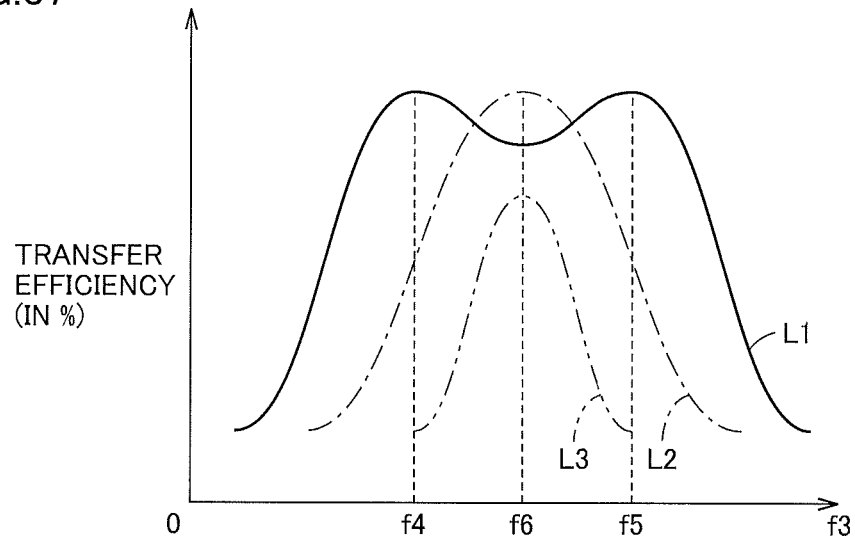
FIG. 37 is a graph representing a relationship between power transfer efficiency with an air gap AG varied and a frequency f3 of a current supplied to the primary coil, with a natural frequency f0 fixed.

FIG. 37 is a graph representing a relationship between power transfer efficiency with air gap AG varied and frequency f3 of the current supplied to primary coil 58, with natural frequency f0 fixed.

In the FIG. 37 graph, the axis of abscissa represents frequency f3 of the current supplied to primary coil 58, and the axis of ordinate represents power transfer efficiency (in %). An efficiency curve L1 represents a relationship between a power transfer efficiency provided when air gap AG is small and frequency f3 of the current supplied to primary coil 58. As indicated by efficiency curve L1, when air gap AG is small, power transfer efficiency peaks at frequencies f4 and f5, wherein f4<f5. As air gap AG becomes larger, and as power transfer efficiency increases, it has the two peaks approaching each other. Then, as indicated by an efficiency curve L2, when air gap AG is larger than a prescribed distance, power transfer efficiency has a single peak, and when primary coil 58 receives a current having a frequency f6, power transfer efficiency peaks. When air gap AG is still larger than that corresponding to efficiency curve L2, then, as indicated by an efficiency curve L3, power transfer efficiency peaks lower.

For example, more efficient power transfer may be achieved by a first methodology, as follows: Primary coil 58 shown in FIG. 1 may be supplied with a current fixed in frequency and primary and secondary capacitors 59, 23 and the like may be varied in capacitance in accordance with air gap AG to change a characteristic of power transfer efficiency between power transmitting unit 56 and power receiving unit 20. More specifically, while primary coil 58 is supplied with a current fixed in frequency, primary and secondary capacitors 59 and 23 are adjusted in capacitance to allow power transfer efficiency to peak. In this methodology, primary coil 58 and secondary coil 22 pass a current fixed in frequency, regardless of the size of air gap AG. The characteristic of power transfer efficiency may alternatively be changed by utilizing a matching device provided between power transmitting device 50 and high-frequency power driver 54 or by utilizing converter 14, or the like.

A second methodology is based on the size of air gap AG to adjust in frequency a current supplied to primary coil 58. For example, in FIG. 37, for a power transfer characteristic corresponding to efficiency curve L1, primary coil 58 is supplied with a current of frequency f4 or f5. For power transfer characteristics corresponding to efficiency curves L2 and L3, primary coil 58 is supplied with a current of frequency f6. Thus a current that passes through primary coil 58 and secondary coil 22 will be varied in frequency in accordance with the size of air gap AG.

In the first methodology, primary coil 58 will pass a current fixed in frequency, whereas in the second methodology, primary coil 58 will pass a current varying in frequency, as appropriate, with air gap AG. The first or second methodology or the like is thus employed to supply primary coil 58 with a current of a specific frequency set to provide efficient power transfer. As primary coil 58 passes the current of the specific frequency therethrough, primary coil 58 forms a magnetic field (an electromagnetic field) surrounding primary coil 58 and oscillating at a specific frequency.

Power receiving unit 20 receives electric power from power transmitting unit 56 through at least one of a magnetic field formed between power receiving unit 20 and power transmitting unit 56 and oscillating at a specific frequency and an electric field formed between power receiving unit 20 and power transmitting unit 56 and oscillating at a specific frequency. Accordingly, "a magnetic field oscillating at a specific frequency" is not limited to a magnetic field of a fixed frequency, and "an electric field oscillating at a specific frequency" is also not limited to an electric field of a fixed frequency.

Note that while in the above example air gap AG is focused on and a current that is supplied to primary coil 58 is accordingly set in frequency, power transfer efficiency also varies with other factors such as horizontal misalignment of primary and secondary coils 58 and 22, and the current supplied to primary coil 58 may be adjusted in frequency based on such other factors.

An example has been described with a resonant coil implemented as a helical coil. If the resonant coil is an antenna such as a meander line antenna, primary coil 58, passing a current of a specific frequency therethrough, is surrounded by an electric field of a specific frequency. Through this electric field, power transmitting unit 56 and power receiving unit 20 transfer electric power therebetween.

Figure 38:
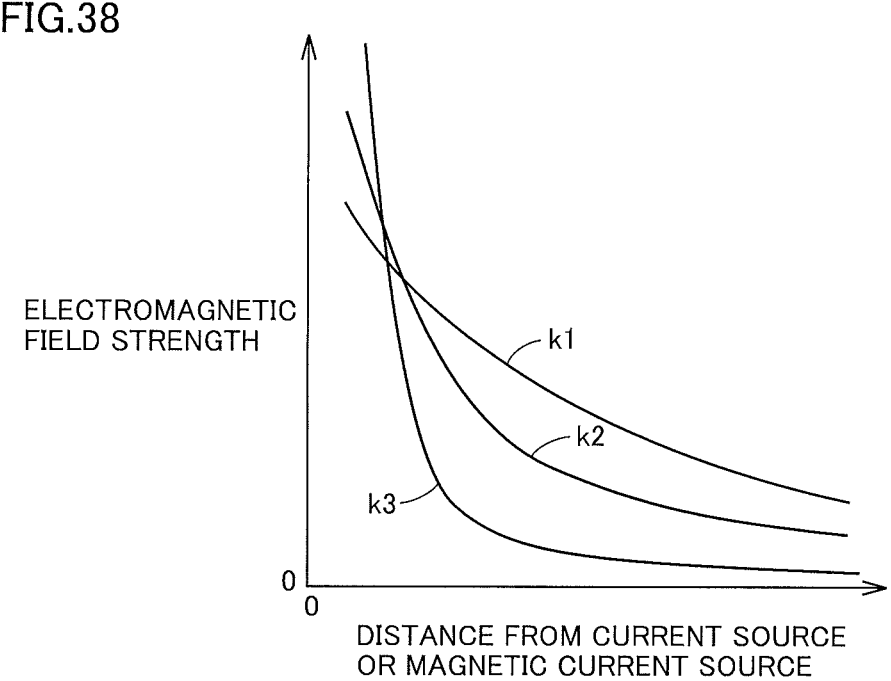
FIG. 38 represents a relationship between a distance from a current source or a magnetic current source and the strength of an electromagnetic field.

The power transfer system of the present embodiment allows a near field where a "static electromagnetic field" of an electromagnetic field is dominant (or an evanescent field) to be utilized to transmit and receive electric power more efficiently. FIG. 38 is a diagram showing a relationship between a distance from a current source or a magnetic current source and the strength of an electromagnetic field. With reference to FIG. 38, the electromagnetic field includes three components. A curve k1 represents a component in inverse proportion to a distance from a wave source, referred to as a "radiated electromagnetic field". A curve k2 represents a component in inverse proportion to the square of the distance from the wave source, referred to as an "induced electromagnetic field". A curve k3 represents a component in inverse proportion to the cube of the distance from the wave source, referred to as a "static electromagnetic field". When the electromagnetic field has a wavelength $\lambda$, a distance allowing the "radiated electromagnetic field," the "induced electromagnetic field," and the "static electromagnetic field" to be substantially equal in strength can be represented as $\lambda/2\pi$.

A "static electromagnetic field" is a region where an electromagnetic wave rapidly decreases in strength as a function of the distance from the wave source, and the power transfer system according to the present embodiment leverages a near field dominated by the static electromagnetic field (i.e., an evanescent field) to transfer energy (or electric power). More specifically, power transmitting unit 56 and power receiving unit 20 having close natural frequencies (e.g., a pair of LC resonant coils) are resonated in a near field dominated by a "static electromagnetic field" to transfer energy (or electric power) from power transmitting unit 56 to power receiving unit 20. The "static electromagnetic field" does not propagate energy over a long distance, and resonance methodology can transfer electric power with less energy loss than an electromagnetic wave which transfers energy (or electric power) via the "radiated electromagnetic field" propagating energy over a long distance.

Such an electromagnetic field as formed between a power receiving unit and a power transmitting unit may be referred to as a near field resonant coupling field, for example. The power receiving unit and the power transmitting unit have a coupling coefficient κ therebetween for example of approximately 0.3 or smaller, preferably 0.1 or smaller. Coupling coefficient κ in a range of approximately 0.1-0.3 may also be applied. Coupling coefficient κ is not limited to such a value and may assume any value allowing satisfactory power transfer.

Coupling of power transmitting unit 56 and power receiving unit 20 in power transfer in the present embodiment is referred to for example as "magnetic resonant coupling," "magnetic field resonant coupling," "magnetic field resonant coupling," "near field resonant coupling," "electromagnetic field resonant coupling," or "electric field resonant coupling".

"Electromagnetic field resonant coupling" means coupling including all of "magnetic resonant coupling," "magnetic field resonant coupling" and "electric field resonant coupling.

Primary coil 58 of power transmitting unit 56 and secondary coil 22 of power receiving unit 20 as described in the present specification are coil antennas, and accordingly, power transmitting unit 56 and power receiving unit 20 are coupled mainly by a magnetic field and power transmitting unit 56 and power receiving unit 20 are "coupled by magnetic resonant coupling" or "coupled by magnetic field resonant coupling".

Note that primary and secondary coils 58, 22 may for example be meander line antennas, and in that case, power transmitting unit 56 and power receiving unit 20 are coupled mainly via an electric field. In that case, power transmitting unit 56 and power receiving unit 20 are "coupled by electric field resonant coupling." Thus in the present embodiment power receiving unit 20 and power transmitting unit 56 transfer electric power therebetween contactlessly. In thus transferring electric power contactlessly, a magnetic field is mainly formed between power receiving unit 20 and power transmitting unit 56.

While the above embodiments have been described with power transmitting unit 56 transmitting electric power to power receiving unit 20, the present invention can also prevent power receiving unit 20 from transmitting electric power to power transmitting unit 56 with a foreign matter present therebetween.

It should be understood that the embodiments disclosed herein have been described for the purpose of illustration only and in a non-restrictive manner in any respect. The scope of the present invention is defined by the terms of the claims, and is intended to include any modifications within the meaning and scope equivalent to the terms of the claims. Furthermore, the above indicated numerical values and the like are illustrative and are not limited numerically or in range as above.

REFERENCE SIGNS LIST

9: adjustment unit; 10: electrically driven vehicle; 10A: vehicular body; 11, 191: power receiving device; 13: rectifier; 14: converter; 15: battery; 16: power control unit; 17: motor unit; 18: movable mechanism control unit; 19B: rear wheel; 19BL: left rear wheel; 19BR: right rear wheel; 19F: front wheel; 19FL: left front wheel; 19FR: right front wheel; 20, 196: power receiving unit; 21: secondary ferrite core (cylindrical core); 22: secondary coil; 22a: first end; 22b: second end; 23: secondary capacitor; 24: secondary coil unit; 25: bottom surface; 26: floor panel; 27: secondary side's casing; 28: secondary side's shield; 28a, 63a: top; 28b, 63b: enclosing/annular peripheral wall; 29: secondary side's lid member; 29r, 64r: internal surface; 30: drive mechanism; 31: link mechanism; 32, 110: drive unit; 33: biasing member; 34L: left peripheral portion; 33a, 33b: resilient member; 34B: rear peripheral portion; 34F: front peripheral portion; 34R: right peripheral portion; 35, 93: stopper; 36: switching unit; 37, 38, 87: support member; 40, 45: rotary shaft; 41, 42, 46, 48: leg; 47: engine; 49, 61: antenna; 50, 190: power transmitting device; 51: external power feeding apparatus; 52: parking space; 53: ac power supply; 54: high-frequency power driver; 55: control unit; 56, 193: power transmitting unit; 57: primary ferrite core; 58: primary coil; 59: primary capacitor; 60: primarily coil unit; 62: primary side's casing; 63: primary side's shield; 64: primary side's lid member; 64C: region; 66L: left rear side portion; 66R: right rear side portion; 73: end wall; 74, 75: side wall; 80, 81, 92: gear; 82: motor; 83, 84, 85, 86: end; 88: body of holding device; 89: holding device; 90, 91: stopper piece; 95: rotor; 96: stator; 97: encoder; 98: axial shaft; 99: tooth; 100, 100a, 100b, 100c: temperature sensor; 100A: first temperature sensor group; 100B: second temperature sensor group; 110a: first conductive plate; 110b: second conductive plate; 110c: third conductive plate; 111: torsion spring; 192, 194, 197, 199: coil; 195, 198: capacitor; 300: resistor; 500: plate; 550: monitoring circuit; 600: logic circuit (sensor circuit).

The invention claimed is:

1. A power receiving device comprising:
a power receiving unit that receives electric power from an external power transmitting unit contactlessly; and
a casing having said power receiving unit accommodated therein, said casing including
a lid member located on said power transmitting unit's side and allowing a magnetic field to pass therethrough, and
a plurality of temperature sensors provided at said lid member and sensing in temperature a foreign matter present between said power transmitting unit and said power receiving unit, said temperature sensors being spaced closer together at a location of a strong portion of an electromagnetic field strength generated from said power receiving unit than a location of a weak portion of said electromagnetic field strength generated from said power receiving unit.

2. The power receiving device according to claim 1, wherein:
said power receiving unit includes a solenoid type coil unit;
said coil unit has a tabular core, and a coil wound on a peripheral surface of said core about a winding axis; and
said electromagnetic field strength has said strong portion in a direction transverse to said winding axis at a region having said core exposed in a vicinity of an end of said coil transverse to said winding axis.

3. The power receiving device according to claim 1, wherein:
said power receiving unit includes an annular coil unit;
said coil unit has a cylindrical core, and an annular coil wound on a peripheral surface of said core; and
said coil unit presents an electromagnetic field strength such that said electromagnetic field strength generated from said power receiving unit has said strong portion at a center region of said coil.

4. The power receiving device according to claim 1, wherein said temperature sensors are PTC thermistors, respectively.

5. The power receiving device according to claim 4, wherein said PTC thermistors are connected in series.

6. The power receiving device according to claim 5, wherein:
said PTC thermistors have two or more sensor groups each of a plurality of said PTC thermistors connected in series; and
the power receiving device has a sensor circuit that outputs a sense signal when said PTC thermistor included in any one of said sensor groups senses a temperature equal to or higher than a prescribed temperature.

7. The power receiving device according to claim 1, wherein:
said power receiving unit is mounted in a vehicle; and
said power receiving unit is provided with a drive mechanism capable of moving said power receiving unit toward said power transmitting unit to be adjacent thereto and moving said power receiving unit away from said power transmitting unit.

8. The power receiving device according to claim 1, wherein said power transmitting unit and said power receiving unit have natural frequencies, respectively, with a difference smaller than or equal to 10% of said natural frequency of said power receiving unit.

9. The power receiving device according to claim 1, wherein said power receiving unit and said power transmitting unit have a coupling coefficient equal to or smaller than 0.3.

10. The power receiving device according to claim 1, wherein said power receiving unit receives electric power from said power transmitting unit through at least one of a magnetic field formed between said power receiving unit and said power transmitting unit and oscillating at a specific frequency and an electric field formed between said power receiving unit and said power transmitting unit and oscillating at a specific frequency.

11. A power transmitting device comprising:
a power transmitting unit that contactlessly transmits electric power to a power receiving unit mounted in a vehicle; and
a casing having said power transmitting unit accommodated therein, said casing including
a lid member located on said power receiving unit's side and allowing an electromagnetic field to pass therethrough, and
a plurality of temperature sensors provided at said lid member and sensing in temperature a foreign matter present between said power transmitting unit and said power receiving unit, said temperature sensors being spaced closer together at a location of a strong portion of an electromagnetic field strength generated from said power transmitting unit than a location of a weak portion of said electromagnetic field strength generated from said power transmitting unit.

12. The power transmitting device according to claim 11, wherein:
said power transmitting unit includes a solenoid type coil unit;
said coil unit has a tabular core, and a coil wound on a peripheral surface of said core about a winding axis; and
said electromagnetic field strength has said strong portion in a direction transverse to said winding axis at a region having said core exposed in a vicinity of an end of said coil transverse to said winding axis.

13. The power transmitting device according to claim 11, wherein:
said power transmitting unit includes an annular coil unit;
said coil unit has a cylindrical core, and an annular coil wound on a peripheral surface of said core; and
said coil unit presents an electromagnetic field strength such that said electromagnetic field strength generated from said power transmitting unit has said strong portion at a center region of said coil.

14. The power transmitting device according to claim 11, wherein said temperature sensors are PTC thermistors, respectively.

15. The power transmitting device according to claim 14, wherein said PTC thermistors are connected in series.

16. The power transmitting device according to claim 15, wherein:
said PTC thermistors have two or more sensor groups each of a plurality of said PTC thermistors connected in series; and
the power transmitting device has a sensor circuit that outputs a sense signal when said PTC thermistor included in any one of said sensor groups senses a temperature equal to or higher than a prescribed temperature.

17. The power transmitting device according to claim 11, wherein said power transmitting unit and said power receiving unit have natural frequencies, respectively, with a difference smaller than or equal to 10% of said natural frequency of said power receiving unit.

18. The power transmitting device according to claim 11, wherein said power receiving unit and said power transmitting unit have a coupling coefficient equal to or smaller than 0.3.

19. The power transmitting device according to claim 11, wherein said power transmitting unit receives electric power from said power transmitting unit through at least one of a magnetic field formed between said power receiving unit and said power transmitting unit and oscillating at a specific frequency and an electric field formed between said power receiving unit and said power transmitting unit and oscillating at a specific frequency.

* * * * *